United States Patent
Sun et al.

(10) Patent No.: US 11,341,198 B2
(45) Date of Patent: May 24, 2022

(54) SYSTEMS AND METHODS FOR DATA PROCESSING RELATED TO AN ONLINE TO OFFLINE SERVICE

(71) Applicant: BEIJING DIDI INFINITY TECHNOLOGY AND DEVELOPMENT CO., LTD., Beijing (CN)

(72) Inventors: Yang Sun, Beijing (CN); Liying He, Beijing (CN); Tianze Cui, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/723,299

(22) Filed: Dec. 20, 2019

(65) Prior Publication Data

US 2020/0125616 A1 Apr. 23, 2020

Related U.S. Application Data

(63) Continuation of application No. PCT/CN2018/091757, filed on Jun. 19, 2018.

(30) Foreign Application Priority Data

Jun. 20, 2017 (CN) .......................... 201710477519.2
Jul. 17, 2017 (CN) .......................... 201710581815.7

(51) Int. Cl.
*G06F 16/9535* (2019.01)
*G06F 16/955* (2019.01)
(Continued)

(52) U.S. Cl.
CPC ........ *G06F 16/9535* (2019.01); *G06F 16/178* (2019.01); *G06F 16/955* (2019.01); *G06F 16/9537* (2019.01)

(58) Field of Classification Search
CPC ............... G06F 16/9535; G06F 16/955; G06F 16/9537; G06F 16/178
See application file for complete search history.

(56) References Cited

U.S. PATENT DOCUMENTS

| 8,510,764 B1 | 8/2013 | Deselaers et al. |
| 9,632,901 B2 | 4/2017 | Raikin et al. |
| (Continued) | | |

FOREIGN PATENT DOCUMENTS

| CN | 103810033 A | 5/2014 |
| CN | 104468103 A | 3/2015 |
| (Continued) | | |

OTHER PUBLICATIONS

International Search Report in PCT/CN2018/091757 dated Sep. 18, 2019, 4 Pages.

(Continued)

*Primary Examiner* — Mark D Featherstone
*Assistant Examiner* — Faezeh Forouharnejad
(74) *Attorney, Agent, or Firm* — Metis IP LLC

(57) ABSTRACT

A method may include receiving, from a first application installed in an electronic device, a first request for accessing a first set of contents associated with a second application. The method may include obtaining a request time stamp and a content pointer associated with the first set of contents. The method may include placing the link information to a predetermined storage space in the electronic device. The method may include invoking the second application based on the content pointer and obtain an invoking time stamp. The method may include comparing a time interval between the request time stamp and the invoking time stamp to a predetermined time threshold. The method may include accessing the first set of contents in the second application according to the content pointer in response to a determi- (Continued)

nation that the time interval is less than the predetermined time threshold.

20 Claims, 11 Drawing Sheets

(51) Int. Cl.
*G06F 16/9537* (2019.01)
*G06F 16/178* (2019.01)

(56) References Cited

U.S. PATENT DOCUMENTS

| | | | |
|---|---|---|---|
| 2011/0252114 A1 | 10/2011 | Okuyama | |
| 2012/0011027 A1 | 1/2012 | Okuyama | |
| 2013/0067568 A1* | 3/2013 | Obasanjo | G06F 21/31 726/20 |
| 2013/0290378 A1 | 10/2013 | Kosuru | |
| 2013/0326006 A1 | 12/2013 | Grebnov et al. | |
| 2014/0280896 A1* | 9/2014 | Papakostas | H04W 4/50 709/224 |
| 2015/0347010 A1* | 12/2015 | Yang | G06F 3/0414 715/765 |
| 2016/0248747 A1 | 8/2016 | Ye et al. | |
| 2017/0180335 A1* | 6/2017 | Quinlan | H04L 63/0428 |
| 2017/0201520 A1* | 7/2017 | Chandoor | H04L 63/108 |
| 2017/0212612 A1* | 7/2017 | Zhou | G06F 3/04883 |
| 2017/0257216 A1* | 9/2017 | Perga | H04L 63/0428 |
| 2018/0239744 A1* | 8/2018 | Hu | G06F 40/14 |
| 2018/0307774 A1 | 10/2018 | Zhou | |
| 2018/0348980 A1 | 12/2018 | Ma et al. | |

FOREIGN PATENT DOCUMENTS

| | | |
|---|---|---|
| CN | 105138263 A | 12/2015 |
| CN | 105429929 A | 3/2016 |
| CN | 105447715 A | 3/2016 |
| CN | 105786516 A | 7/2016 |
| CN | 106406931 A | 2/2017 |
| CN | 106563266 A | 4/2017 |
| CN | 106919536 A | 7/2017 |
| CN | 106951148 A | 7/2017 |
| WO | 2010029807 A1 | 3/2010 |
| WO | 2015043260 A1 | 4/2015 |

OTHER PUBLICATIONS

Written Opinion in PCT/CN2018/091757 dated Sep. 18, 2019, 5 Pages.
Cake, Deferred Deep Linking : Cake, 2016, 4 pages.
Cody Kimberling, How to Use Deep Linking in Your Mobile App, Savvy Apps, 2015, 6 pages.
Michael Sarlitt, What is app deep linking and how it drives growth, Mike Sarlitt, 2014, 7 pages.
First Office Action in Chinese Application No. 201710477519.2 dated Apr. 10, 2020, 14 pages.
The Extended European Search Report in European Application No. 18820124.8 dated Mar. 20, 2020, 8 pages.
Notice of Reasons for Rejection in Japanese Application No. 2019-570004 dated Feb. 24, 2021, 7 pages.
First Office Action in Chinese Application No. 201710581815.7 dated Oct. 12, 2020, 10 pages.
Feng, Tianwen et al., Page Jump of Java Web Programming, Journal of Hubei University of Education. 29(8):44-47, 2012.

* cited by examiner

900

```
┌─────────────────────────────────────────────┐
│ When receiving, from a first application,   │
│ a first request for accessing a first set   │──902
│ of contents associated with a second        │
│ application, obtaining a content pointer    │
│ associated with the second application      │
└─────────────────────────────────────────────┘
                    │
                    ▼
┌─────────────────────────────────────────────┐
│ Placing the content pointer to a            │──904
│ predetermined storage space                 │
└─────────────────────────────────────────────┘
                    │
                    ▼
┌─────────────────────────────────────────────┐
│ Invoking the second application based on    │──906
│ the content pointer                         │
└─────────────────────────────────────────────┘
                    │
                    ▼
┌─────────────────────────────────────────────┐
│ Accessing the first set of contents in the  │
│ second application based on the content     │──908
│ pointer in the predetermined storage space  │
└─────────────────────────────────────────────┘
```

```
┌─────────────────────────────────────────────┐
│ When receiving, from a first application, a first request │
│ for accessing a first set of contents associated with a   │──1002
│ second application, obtaining link information            │
│ associated with the first set of contents, wherein the    │
│ link information includes a request time stamp and a      │
│ content pointer                                           │
└─────────────────────────────────────────────┘
                        ↓
┌─────────────────────────────────────────────┐
│                                             │──1004
│ Placing the link information to a predetermined │
│ storage space                                   │
└─────────────────────────────────────────────┘
                        ↓
┌─────────────────────────────────────────────┐
│ Invoking the second application based on the content │──1006
│ pointer and obtaining an invoking time stamp to      │
│ determine a time interval between the request time   │
│ stamp and the invoking time stamp                    │
└─────────────────────────────────────────────┘
                        ↓
┌─────────────────────────────────────────────┐
│                                             │──1008
│ Determining whether to access the first set of contents │
│ in the second application based on the time interval    │
└─────────────────────────────────────────────┘
```

FIG. 10

SYSTEMS AND METHODS FOR DATA PROCESSING RELATED TO AN ONLINE TO OFFLINE SERVICE

CROSS-REFERENCE TO RELATED APPLICATIONS

This application is a continuation of International Application No. PCT/CN2018/091757, filed on Jun. 19, 2018, which claims priority of Chinese Patent Application No. 201710477519.2 filed on Jun. 20, 2017, Chinese Patent Application No. 201710581815.7 filed on Jul. 17, 2017, the entire contents of which are hereby incorporated by reference.

TECHNICAL FIELD

The present disclosure generally relates to Internet technology, and in particular, relates to systems and methods for data processing related to an online to offline service.

BACKGROUND

With the arrival of the mobile Internet era, mobile devices such as smart phones play an important role in daily life. Usually, there are a number of applications (APPs) installed in any particular smart phone. For example, an application may be associated with an online to offline service, such as a taxi-hailing service, a social service, etc. In some cases, a user may access, through a first application installed in the smart phone, certain contents (e.g., an electronic coupon and/or a link) associated with a second application installed in the smart phone. However, sometimes there are certain problems when the user attempts to access certain contents associated with the second application through the first application. For example, when the user requests, through the first application, an electronic coupon associated with the second application using a phone number, and there are a number of accounts related to the phone number in the first application, it is difficult for a server to identify the account that is associated with the second application and corresponds to the phone number. As another example, when the user clicks, in the first application, a shared link associated with the second application, sometimes it is difficult to invoke the second application through the first application and specifically access the contents of shared link in the second application. Therefore, it is desirable to provide systems and methods for data processing to solve the above problems.

SUMMARY

According to a first aspect of the present disclosure, a system for data processing may include one or more storage media and one or more processors configured to communicate with the one or more storage media. The one or more storage media may include a set of instructions. When the one or more processors executing the set of instructions, the one or more processors may be directed to perform one or more of the following operations. The one or more processors may receive, from a first application installed in a first electronic device, a first request for a virtual item associated with a second application installed in the first electronic device. The first request may include user information. The one or more processors may obtain a unique identifier (UID) based on the user information. The one or more processors may transmit the virtual item to a first account associated with the first application in the first electronic device based on the UID. The first account may be uniquely identifiable with the UID in the first application.

In some embodiments, the one or more processors may determine that the first account and a second account, which corresponds to the UID and is associated with the second application, has not received the virtual item before transmitting the virtual item to the first account associated with the first application in the first electronic device based on the UID.

In some embodiments, the one or more processors may synchronize information related to the virtual item in the first account and the second account.

In some embodiments, the information related to the virtual item may include at least one of the virtual item, a time of receiving the virtual item, which of the first account and the second account receives the virtual item, whether the virtual item has been used, a time of using the virtual item, or which of the first account and the second account used the virtual item.

In some embodiments, to synchronize the information related to the virtual item in the first account and the second account, the one or more processors may transmit, to the second account, a first message indicating a time when the first account receives the virtual item.

In some embodiments, to synchronize the information related to the virtual item in the first account and the second account, the one or more processors may transmit the virtual item to the second account associated with the second application in the first electronic device.

In some embodiments, the one or more processors may receive, from the second account, a second request for using the virtual item. The one or more processors may determine that the virtual item has not been used. The one or more processors may transmit a second message indicating that the second request for using the virtual item is allowed in response to the determination that the virtual item has not been used.

In some embodiments, to synchronize the information related to the virtual item in the first account and the second account, the one or more processors may receive, from the second account, a third message indicating that the virtual item has been used in the second account. The one or more processors may transmit the third message to the first account to synchronize the information related to the virtual item in the first account with that in the second account.

In some embodiments, the virtual item may include an electronic coupon.

In some embodiments, the one or more processors may associate the UID with the virtual item.

In some embodiments, to transmit the virtual item to the first account associated with the first application in the first electronic device based on the UID, the one or more processors may transmit the first request for the virtual item and the UID to a second electronic device. The one or more processors may direct the second electronic device to transmit the virtual item to the first account associated with the first application in the first electronic device based on the UID.

According to another aspect of the present disclosure, a method for data processing may include one or more of the following operations. One or more processors may receive, from a first application installed in a first electronic device, a first request for a virtual item associated with a second application installed in the first electronic device. The first request may include user information. The one or more processors may obtain a unique identifier (UID) based on the user information. The one or more processors may transmit the virtual item to a first account associated with the first application in the first electronic device based on the UID. The first account may be uniquely identifiable with the UID in the first application.

According to yet another aspect of the present disclosure, a system for data processing may include a receiving module configured to receive, from a first application installed in a first electronic device, a first request for a virtual item associated with a second application installed in the first electronic device. The first request may include user information. The system may also include an identification module configured to obtain a unique identifier (UID) based on the user information. The system may also include a first controlling module configured to transmit the virtual item to a first account associated with the first application in the first electronic device based on the UID. The first account may be uniquely identifiable with the UID in the first application.

According to yet another aspect of the present disclosure, a non-transitory computer readable medium may comprise at least one set of instructions. The at least one set of instructions may be executed by one or more processors of a computer server. The one or more processors may receive, from a first application installed in a first electronic device, a first request for a virtual item associated with a second application installed in the first electronic device. The first request may include user information. The one or more processors may obtain a unique identifier (UID) based on the user information. The one or more processors may transmit the virtual item to a first account associated with the first application in the first electronic device based on the UID. The first account may be uniquely identifiable with the UID in the first application.

According to yet another aspect of the present disclosure, an electronic device for data processing may include one or more storage media and one or more processors configured to communicate with the one or more storage media. The one or more storage media may include a set of instructions. When the one or more processors executing the set of instructions, the one or more processors may be directed to perform one or more of the following operations. The one or more processors may receive, from a first application installed in the electronic device, a first request for accessing a first set of contents associated with a second application. The one or more processors may obtain link information associated with the first set of contents, wherein the link information includes a request time stamp and a content pointer. The one or more processors may place the link information to a predetermined storage space in the electronic device. The one or more processors may invoke the second application based on the content pointer and obtain an invoking time stamp. The one or more processors may compare a time interval between the request time stamp and the invoking time stamp to a predetermined time threshold. The one or more processors may access the first set of contents in the second application according to the content pointer in response to a determination that the time interval is less than the predetermined time threshold, or access a second set of contents in the second application according to default settings of the second application in response to a determination that the time interval is equal to or more than the predetermined time threshold.

In some embodiments, the one or more processors may determine that the second application is installed in the electronic device before invoking the second application.

In some embodiments, the one or more processors may determine that the second application is not installed in the electronic device before invoking the second application. The one or more processors may install the second application in the electronic device after obtaining a positive feedback from a user of the electronic device.

In some embodiments, the content pointer may include an application identifier of the second application and a content identifier for the first set of contents.

In some embodiments, the application identifier and the content identifier may be included in a same uniform resource identifier (URI).

In some embodiments, the application identifier and the content identifier may be included in different URIs.

In some embodiments, the application identifier may be a URI scheme.

In some embodiments, the second set of contents may be a homepage of the second application In some embodiments, the predetermined storage space may include a clipboard in the electronic device.

According to yet another aspect of the present disclosure, a method for data processing using an electronic device may include one or more of the following operations. One or more processors may receive, from a first application installed in the electronic device, a first request for accessing a first set of contents associated with a second application. The one or more processors may obtain link information associated with the first set of contents, wherein the link information includes a request time stamp and a content pointer. The one or more processors may place the link information to a predetermined storage space in the electronic device. The one or more processors may invoke the second application based on the content pointer and obtain an invoking time stamp. The one or more processors may compare a time interval between the request time stamp and the invoking time stamp to a predetermined time threshold. The one or more processors may access the first set of contents in the second application according to the content pointer in response to a determination that the time interval is less than the predetermined time threshold, or access a second set of contents in the second application according to default settings of the second application in response to a determination that the time interval is equal to or more than the predetermined time threshold.

According to yet another aspect of the present disclosure, an electronic device for data processing may include an obtaining module configured to receive, from a first application installed in the electronic device, a first request for accessing a first set of contents associated with a second application, and obtain link information associated with the first set of contents, wherein the link information includes a request time stamp and a content pointer. The electronic device may also include a storage module configured to place the link information to a predetermined storage space in the electronic device. The electronic device may also include a processing module configured to invoke the second application based on the content pointer and obtain an invoking time stamp. The electronic device may also include a determination module configured to compare a time interval between the request time stamp and the invoking time stamp to a predetermined time threshold, and access the first set of contents in the second application according to the content pointer in response to a determination that the time interval is less than the predetermined time threshold, or access a second set of contents in the second application according to default settings of the second application in response to a determination that the time interval is equal to or more than the predetermined time threshold.

According to yet another aspect of the present disclosure, a non-transitory computer readable medium may comprise at least one set of instructions. The at least one set of instructions may be executed by one or more processors of an electronic device. The one or more processors may receive, from a first application installed in the electronic device, a first request for accessing a first set of contents associated with a second application. The one or more processors may obtain link information associated with the first set of contents, wherein the link information includes a request time stamp and a content pointer. The one or more processors may place the link information to a predetermined storage space in the electronic device. The one or more processors may invoke the second application based on the content pointer and obtain an invoking time stamp. The one or more processors may compare a time interval between the request time stamp and the invoking time stamp to a predetermined time threshold. The one or more processors may access the first set of contents in the second application according to the content pointer in response to a determination that the time interval is less than the predetermined time threshold, or access a second set of contents in the second application according to default settings of the second application in response to a determination that the time interval is equal to or more than the predetermined time threshold.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 9 is a flowchart illustrating an exemplary process for data processing related to an online to offline service according to some embodiments of the present disclosure;

FIG. 10 is a flowchart illustrating an exemplary process for data processing related to an online to offline service according to some embodiments of the present disclosure.

DETAILED DESCRIPTION

Figure 1:
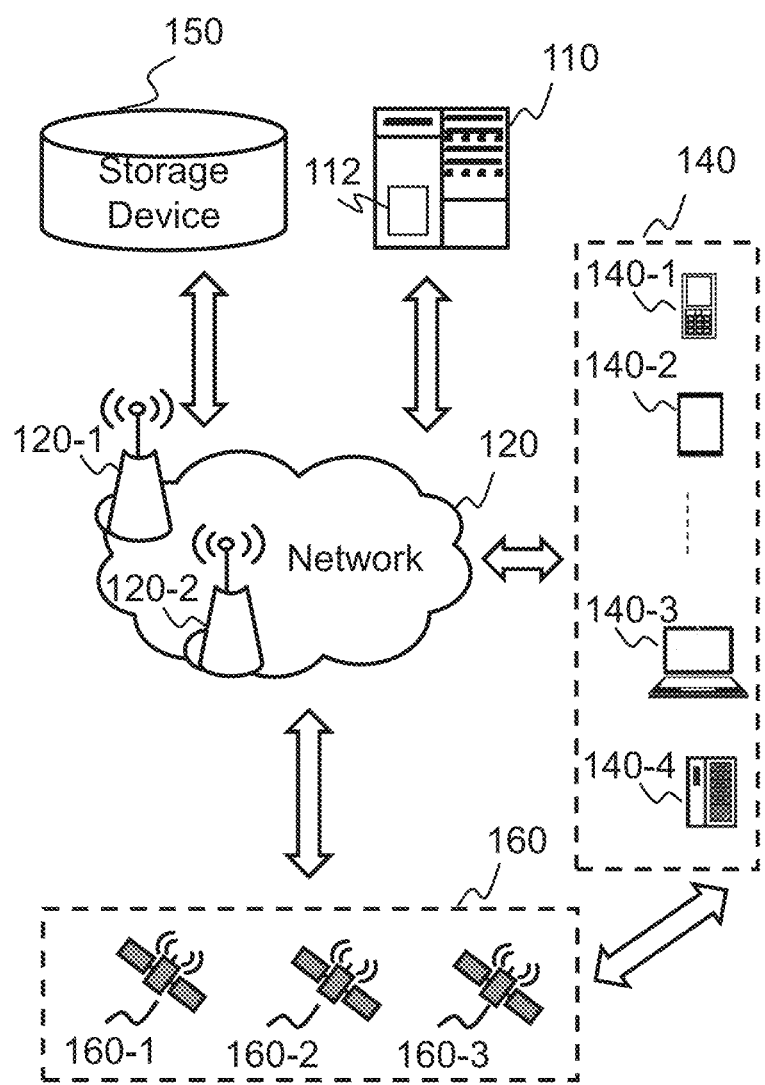
FIG. 1 is a schematic diagram illustrating an exemplary online to offline service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for transmitting, to a first application in a smart phone, an electronic coupon associated with a second application in the smart phone based on a unique identifier (UID) of the second application. In some cases, if a user of the smart phone wants to request an electronic coupon of the second application through the first application, the user may input a phone number that is linked with an account of the second application in the first application, and transmit, via a network, the phone number to a server to request the electronic coupon through the first application. However, sometimes it is difficult for the server to identify the account of the second application based on the phone number, because there may be a plurality of accounts that are linked with the phone number in the first application. For example, the user may also bind the phone number with an account of the first application. With the invention herein disclosed, the server may obtain a UID of the account of the second application based on the phone number. The account of the second application may be uniquely identifiable with the UID in the first application. The server may accurately identify the account of the second application in the first application based on the UID and transmit the electronic coupon to the account of the second application in the first application.

Another aspect of the present disclosure relates to systems and methods for accessing specific contents of a second application through a first application. When a user of a smart phone tries to access a link associated with a second application through a first application, the user often expects to directly invoke the second application and view the content of the shared link in the second application. To this end, when the user clicks the shared link in the first application, the smart phone may obtain link information of the shared link and place the link information to a clipboard of the smart phone. The smart phone may invoke the second application and access the contents of the shared link in the second application based on the link information in the clipboard of the smart phone.

FIG. 1 is a schematic diagram of an exemplary map service system according to some embodiments. The online to offline service system 100 may include a server 110, a network 120, a user terminal 140, a storage device 150, and a positioning system 160.

In some embodiments, the server 110 may be a single server or a server group. The server group may be centralized, or distributed (e.g., server 110 may be a distributed system). In some embodiments, the server 110 may be local or remote. For example, the server 110 may access information and/or data stored in the user terminal 140, and/or the storage device 150 via the network 120. As another example, the server 110 may be directly connected to the user terminal 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data to perform one or more functions described in the present disclosure. For example, the processing engine 112 may direct an electronic device to transmit a virtual item (e.g., an electronic coupon) to an account associated with an application in a user terminal (e.g., the user terminal 140). In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components in the online to offline service system 100 (e.g., the server 110, the user terminal 140, the storage device 150, and the positioning system 160) may send information and/or data to other component(s) in the online to offline service system 100 via the network 120. For example, the processing engine 112 may receive, from a first application installed in the user terminal 140, a request for a virtual item (e.g., an electronic coupon) associated with a second application installed in the user terminal. In some embodiments, the network 120 may be any type of wired or wireless network, or a combination thereof. Merely by way of example, the network 120 may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the online to offline service system 100 may be connected to the network 120 to exchange data and/or information.

In some embodiments, the user terminal 140 may include a mobile device 140-1, a tablet computer 140-2, a laptop computer 140-3, or the like, or any combination thereof. In some embodiments, the mobile device 140-1 may include a smart home device, a wearable device, a mobile equipment, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, glasses, a helmet, a watch, clothing, a backpack, a smart accessory, or the like, or any combination thereof. In some embodiments, the mobile equipment may include a mobile phone, a personal digital assistance (PDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftCon™, a Fragments™, a Gear VR™, etc. In some embodiments, the user terminal 140 may be a device with positioning technology for locating the position of the user terminal 140. In some embodiments, the user terminal 140 may send positioning information to the server 110.

The storage device 150 may store data and/or instructions. In some embodiments, the storage device 150 may store data obtained from the user terminal 140 and/or the processing engine 112. For example, the storage device 150 may store a plurality of virtual items. In some embodiments, the storage device 150 may store data and/or instructions that the server 110 may execute or use to perform exemplary methods described in the present disclosure. For example, the storage device 150 may store instructions that the processing engine 112 may execute or use to direct an electronic device to transmit a virtual item (e.g., an electronic coupon) to an account associated with an application in a user terminal (e.g., the user terminal 140). In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components in the online to offline service system 100 (e.g., the server 110, the user terminal 140, etc.). One or more components in the online to offline service system 100 may access the data or instructions stored in the storage device 150 via the network 120. In some embodiments, the storage device 150 may be directly connected to or communicate with one or more components in the online to offline service system 100 (e.g., the server 110, the user terminal 140, etc.). In some embodiments, the storage device 150 may be part of the server 110.

The positioning system 160 may determine information associated with an object, for example, the user terminal 140. For example, the positioning system 160 may determine a location of the user terminal 140 in real time. In some embodiments, the positioning system 160 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, an accumulative mileage number, or a current time. The location may be in the form of coordinates, such as, latitude coordinate and longitude coordinate, etc. The positioning system 160 may include one or more satellites, for example, a satellite 160-1, a satellite 160-2, and a satellite 160-3. The satellites 160-1 through 160-3 may determine the information mentioned above independently or jointly. The satellite positioning system 160 may send the information mentioned above to the network 120, or the user terminal 140 via wireless connections.

Figure 2:
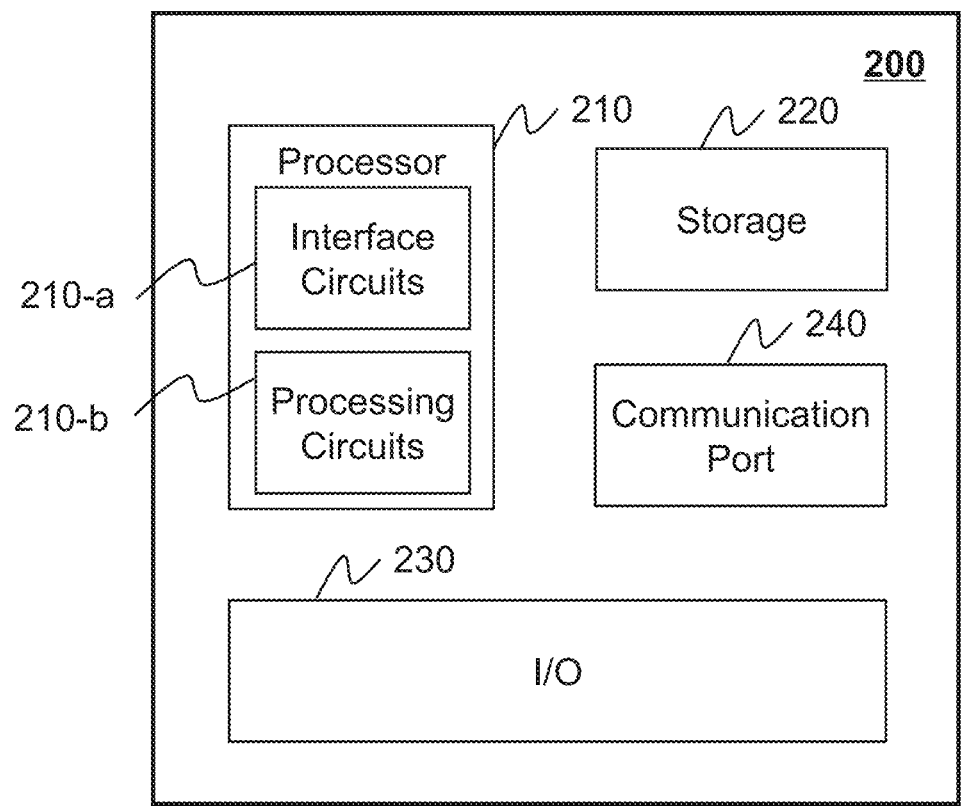
FIG. 2 is a schematic diagram illustrating exemplary hardware and/or software components of a computing device according to some embodiments of the present disclosure.

FIG. 2 is a schematic diagram illustrating exemplary hardware and/or software components of a computing device on which the processing engine 112 may be implemented according to some embodiments of the present disclosure. As illustrated in FIG. 2, the computing device 200 may include a processor 210, a storage 220, an input/output (I/O) 230, and a communication port 240.

The processor 210 (e.g., logic circuits) may execute computer instructions (e.g., program code) and perform functions of the processing engine 112 in accordance with techniques described herein. For example, the processor 210 may include interface circuits 210-$a$ and processing circuits 210-$b$ therein. The interface circuits may be configured to receive electronic signals from a bus (not shown in FIG. 2), wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. For example, the processor 210 may direct an electronic device to transmit a virtual item (e.g., an electronic coupon) to an account associated with an application in a user terminal (e.g., the user terminal 140). In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the user terminal 140, the storage device 150, and/or any other component of the online to offline service system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing engine 112 for directing an electronic device to transmit a virtual item (e.g., an electronic coupon) to an account associated with an application in a user terminal (e.g., the user terminal 140).

The I/O 230 may input and/or output signals, data, information, etc. In some embodiments, the I/O 230 may enable a user interaction with the processing engine 112. For example, a user of the online to offline service system 100 may input a predetermined parameter through the I/O 230. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing engine 112 and the user terminal 140, the positioning system 160, or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc.

Figure 3:
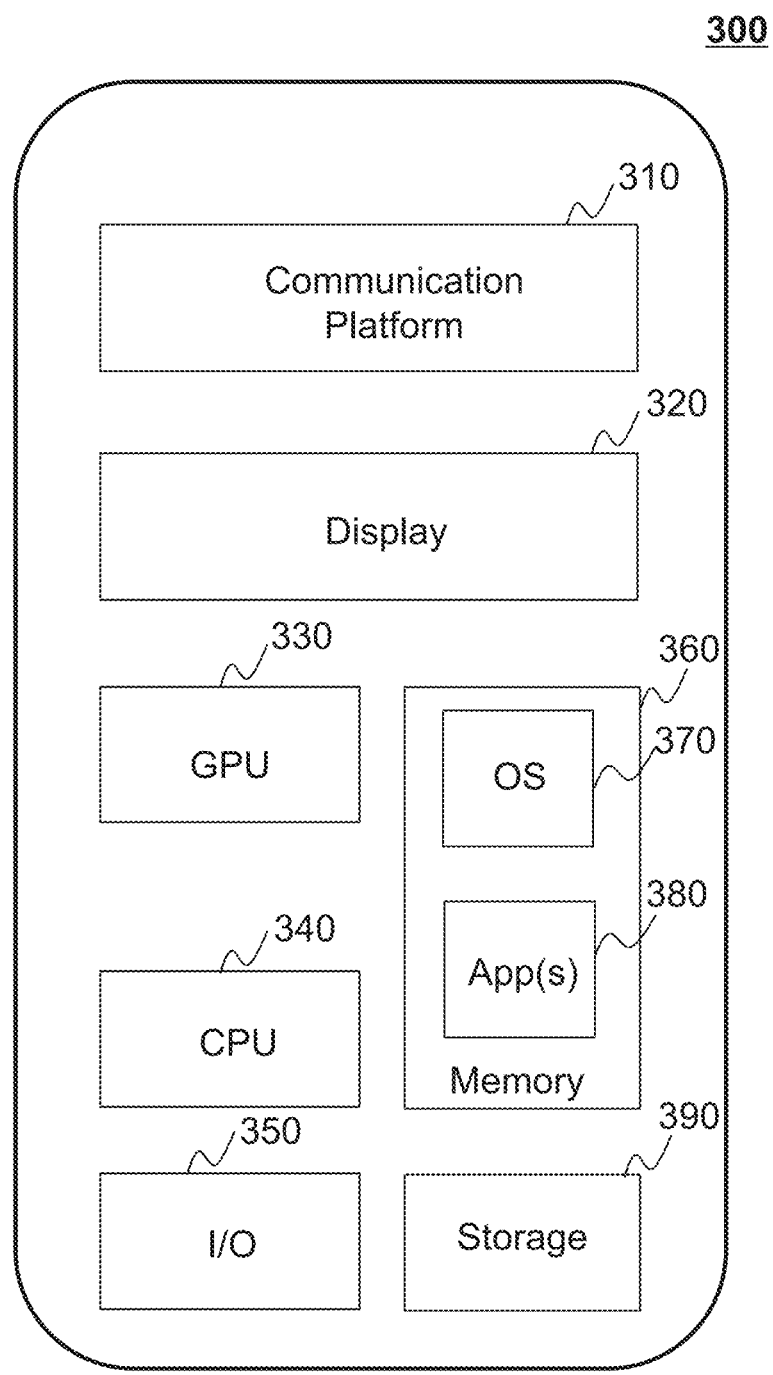
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device on which the user terminal 140 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing engine 112. User interactions with the information stream may be achieved via the I/O 350 and provided to the processing engine 112 and/or other components of the online to offline service system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

One of ordinary skill in the art would understand that when an element of the online to offline service system 100 performs, the element may perform through electrical signals and/or electromagnetic signals. For example, when the processing engine 112 processes a task, such as making a determination, or transmitting information, the processing engine 112 may operate logic circuits in its processor to process such task. When the processing engine 112 sends out data (e.g., an electronic coupon) to the user terminal 140, a processor of the processing engine 112 may generate electrical signals encoding the data. The processor of the processing engine 112 may then send the electrical signals to an information exchange port (e.g., an output port) of the processing engine 112. If the user terminal 140 communicates with the processing engine 112 via a wired network, the information exchange port of the processing engine 112 may be physically connected to a cable, which may further transmit the electrical signals to an information exchange port (e.g., an input port) of the user terminal 140. If the user terminal 140 communicates with the processing engine 112 via a wireless network, the information exchange port of the processing engine 112 may be one or more antennas, which may convert the electrical signals to electromagnetic signals. Within an electronic device, such as the user terminal 140, or the server 110, when a processor thereof processes an instruction, sends out an instruction, and/or performs an action, the instruction and/or action is conducted via electrical signals. For example, when the processor retrieves or saves data from a storage medium (e.g., the storage device 150, and/or the storage 220), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 4A:
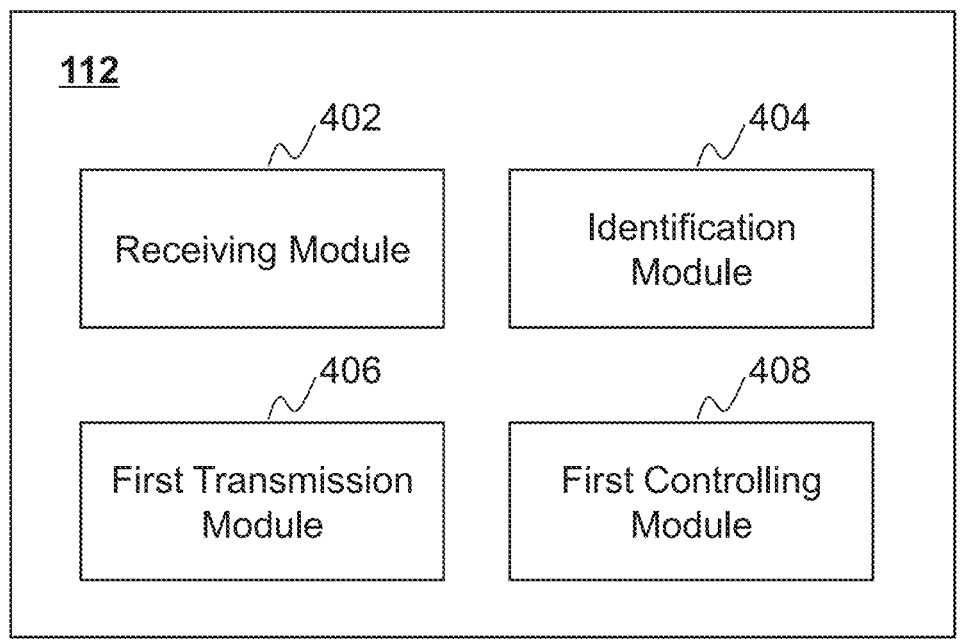
FIG. 4A is a block diagram illustrating an exemplary processing engine according to some embodiments of the present disclosure.

FIG. 4A is a schematic block diagram illustrating an exemplary processing engine according to some embodiments of the present disclosure. The processing engine 112 may include a receiving module 402, an identification module 404, a first transmission module 406, and a first controlling module 408.

The receiving module 402 may be configured to receive, from a first application installed in a first electronic device (e.g., the user terminal 140), a first request for a virtual item associated with a second application installed in the first electronic device. In some embodiments, the first request may include user information.

In some embodiments, the virtual item may be any non-physical object for use in online to offline services. For example, the virtual item may include an electronic coupon, a digital book, digital music, a digital movie, a digital picture, or the like, or any combination thereof.

In some embodiments, before the first use of the second application, the user of the user terminal 140 may register an account of the second application (also referred to as a target account). The user information may include a user name of the target account, a phone number linked with the target account, an e-mail linked with the target account, a unique identifier (UID) of the target account, or the like, or any combination thereof. In some embodiments, when the user registers an account of an application, the account may be allocated a UID that is unique among all identifiers used for a given set of accounts of different applications. The UID may be in a form of numbers, letters, symbols, characters, codes (e.g., a quick response (QR) code), or the like, or any combination thereof.

In some embodiments, the user may input the user information through the first application (e.g., the I/O 350 in FIG. 3). In some embodiments, the user may log in the target account in the first application and take some actions (e.g. press a button displayed in an interface of the first application) to request the virtual item. After the user presses the button, the first application may automatically identify the user information related to the target account.

The identification module 404 may be configured to obtain a unique identifier (UID) based on the user information.

In some embodiments, if the user information includes the UID, the identification module 404 may directly obtain the UID from the user information. In some embodiments, if the user information includes at least one of the user name of the target account, the phone number linked with the target account, and the e-mail linked with the target account, but does not include the UID, the identification module 404 may process the user name of the target account, the phone number linked with the target account, or the e-mail linked with the target account to obtain the UID. For example, the UID corresponding to the target account may be stored in a storage medium (e.g., the storage device 150, the storage 220 of the processing engine 112, the storage 390 of the user terminal 140, or the memory 360 of the user terminal 140) of the online to offline service system 100. The identification module 404 may obtain the UID by accessing the storage medium to read the UID based on the user name of the target account, the phone number linked with the target account, or the e-mail linked with the target account.

The first transmission module 406 may be configured to transmit, via a network (e.g., the network 120), the first request for the virtual item and the UID to a second electronic device associated with the second application. In some embodiments, the second electronic device may be a server of the second application.

The first controlling module 408 may be configured to direct the second electronic device to transmit the virtual item to a first account associated with the first application in the first electronic device based on the UID. The first account may be uniquely identifiable with the UID in the first application.

In some embodiments, the user of the user terminal 140 may log in the target account through both of the first application and the second application, and receive and/or request virtual items of the second application through both of the first application and the second application. The first account refers to the target account logged in through the first application. With the UID, the second electronic device may accurately identify the first account in the first application even though there are a plurality of accounts related to the user information in the first application.

In some embodiments, the server 110 may be a server of the first application, a server of the second application, or a third-party server different from the servers of the first application and the second application.

The modules and/or units in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee™, a Near Field Communication (NFC), or the like, or any combination thereof. Two or more of the modules may be combined as a single module, and any one of the modules may be divided into two or more units. For example, the first transmission module 406 and the first controlling module 408 may be combined as a single module, which is configured to transmit the first request for the virtual item and the UID to the second electronic device associated with the second application, and direct the second electronic device to transmit the virtual item to the first account associated with the first application in the first electronic device based on the UID.

It should be noted that the descriptions above in relation to processing engine 112 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, the first transmission module 406 may be omitted when the processing engine 112 is the server of the second application.

Figure 4B:
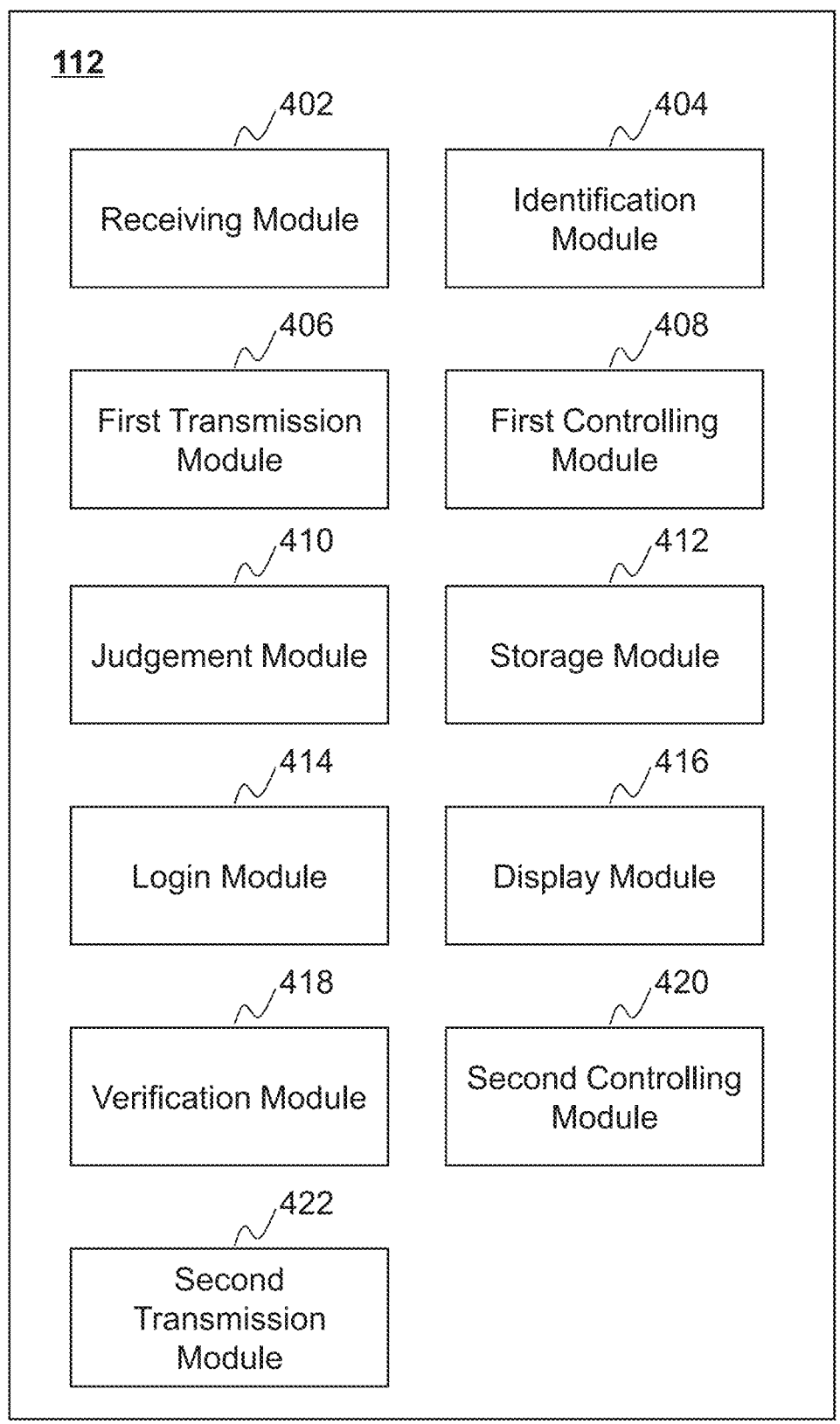
FIG. 4B is a block diagram illustrating an exemplary processing engine according to some embodiments of the present disclosure.

FIG. 4B is a schematic block diagram illustrating an exemplary processing engine according to some embodiments of the present disclosure. As shown in FIG. 4B, besides the receiving module 402, the identification module 404, the first transmission module 406, and the first controlling module 408 illustrated in FIG. 4A, the processing engine 112 may further include a judgement module 410, a storage module 412, a login module 414, a display module 416, a verification module 418, a second controlling module 420, and a second transmission module 422.

The judgement module 410 may be configured to determine whether the account associated with the UID has previously received the virtual item. In some embodiments, the target account logged in through the first application may be referred to as a first account. The target account logged in through the second application may be referred to as a second account. If the first account or the second account receives the virtual item associated with the second application, a record indicating that the first account or the second account corresponding to the UID has received the virtual item associated with the second application may be generated. The record may be stored in a storage medium (e.g., the storage device 150, the storage 220 of the processing engine 112, the storage 390 of the user terminal 140, the memory 360 of the user terminal 140, or the storage module 412 of the processing engine 112) of the online to offline service system 100. The judgement module 410 may access the storage medium to determine whether there is a record indicating that the first account or the second account corresponding to the UID has received the virtual item associated with the second application.

In response to a determination that the UID has not received the virtual item, the first transmission module 406 may transmit the first request for the virtual item and the UID to a second electronic device associated with the second application. In some embodiments, the second electronic device may be a server of the second application.

The storage module 412 may be configured to associate the UID with the virtual item. For example, the storage module 412 may generate a record indicating that the account corresponding to the UID has received the virtual item and store the record in a storage medium (e.g., the storage device 150, the storage 220 of the processing engine 112, the storage 390 of the user terminal 140, the memory 360 of the user terminal 140, or the storage module 412 of the processing engine 112) of the online to offline service system 100.

The display module 416 may transmit a first message indicating information related to the virtual item to a second account associated with the second application in the first electronic device. The second account may refer to the target account logged in through the second application. The information related to the virtual item may include the virtual item itself, information regarding which of the first account or the second account receives the virtual item, a time point of receiving the virtual item, whether the virtual item has been used, which of the first account or the second account uses the virtual item, a time point of using the virtual item, a due date, whether the virtual is valid, usage requirement, or the like, or any combination thereof. For example, for an electronic coupon, the usage requirement may include which online to offline service is configured to use the electronic coupon, other requirement (e.g. how much a user needs to spend) for using the electronic coupon, or the like, or any combination thereof.

In some embodiments, the display module 416 may direct the second electronic device to transmit the virtual item to the second account associated with the second application in the first electronic device. In some embodiments, the display module 416 may simultaneously direct the second electronic device to transmit the virtual item to the first account and the second account. In some embodiments, the display module 416 may direct the second electronic device to transmit the virtual item to the second account after the first account receives the virtual item.

According to the display module 416, in some embodiments, even though the user requests and receives the virtual item through the first application (e.g., the first account), the information related to the virtual item may also be displayed in the second application (e.g., the second account).

Merely by way of example, after receiving the virtual item, the first application may generate the first message indicating that the first account receives the virtual item at 9:00 a.m. The first application may transmit the first message to the processing engine 112 (e.g., the display module 416). The display module 416 may transmit the first message to the second account and direct the second electronic device to transmit the virtual item to the second account.

The login module 414 may be configured to direct the first application and/or the second application to log in the target account. The user of the user terminal 140 may input the user name (or a phone number, an e-mail address linked with the target account) and a password of the target account in the first application or the second application, and transmit the user name (or the phone number, the e-mail address linked with the target account) and the password to the processing engine 112 (e.g., the login module 414). After receiving the user name (or the phone number, the e-mail address linked with the target account) and the password, the login module 414 may direct the first application or the second application to log in the target account (e.g., the first account or the second account).

In some embodiments, if the virtual item is requested and received through the second account, the virtual item and the information related to the virtual item may be synchronized to the first account based on a process similar to operation 614.

The verification module 418 may be configured to receive, from the second account, a second request for using the virtual item, and determine whether the virtual item has been used. For example, when the user presses a display of the virtual item in the second application, the second application may transmit the second request for using the virtual item to the processing engine 112 (e.g., the verification module 418). If the first account or the second account uses the virtual item, a record indicating that the first account or the second account has used the virtual item may be generated. The record may be stored in a storage medium (e.g., the storage device 150, the storage 220 of the processing engine 112, the storage 390 of the user terminal 140, the memory 360 of the user terminal 140, or the storage module 412 of the processing engine 112) of the online to offline service system 100. The verification module 418 may access the storage medium to determine whether there is a record indicating that the first account or the second account has used the virtual item. In some embodiments, "use the virtual item" may refer to using a virtual item that is the same type as the virtual item that has been transmitted in operation 612 (e.g. using an electronic coupon that has the same discount level and expires at the same time as the electronic coupon received in operation 612). In some embodiments, "use the virtual item" may refer to using the particular virtual item that has been transmitted in operation 612.

The second controlling module 420 may be configured to transmit a second message indicating that the second request for using the virtual item is allowed in response to a determination that the virtual item has not been used. According to the second message, the user may use the virtual item.

The second transmission module 422 may be configured to receive, from the second account, a third message indicating that the virtual item has been used in the second account, and transmit the third message to the first account to synchronize the information related to the virtual item in the first account with that in the second account.

In some embodiments, after the virtual item has been used in the second application, the second application may generate the third message indicating that the virtual item has been used in the second application. In order to synchronize the information related to the virtual item in the second account with that in the first account, the second application may transmit the third message to the processing engine 112 (e.g., the second transmission module 422). The second transmission module 422 may transmit the third message to the first application (e.g., the first account).

According to the second transmission module 422, even when the user uses the virtual item through the second application (e.g., the second account), the information related to the virtual item may also be updated in the first application (e.g., the first account).

In some embodiments, the server 110 may be a server of the first application, a server of the second application, or a third-party server different from the servers of the first application and the second application.

The modules and/or units in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee™, a Near Field Communication (NFC), or the like, or any combination thereof. Two or more of the modules may be combined as a single module, and any one of the modules may be divided into two or more units. For example, the display module 416 and the second transmission module 422 may be combined as a single module, which is configured to synchronize the information related to the virtual item in the first account with that in the second account. As another example, the second transmission module 422 may be divided into two units. The first unit may be configured to receive, from the second account, the third message indicating that the virtual item has been used in the second account. The second unit may be configured to transmit the third message to the first account to synchronize the information related to the virtual item in the first account with that in the second account.

It should be noted that the descriptions above in relation to processing engine 112 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, the first transmission module 406 may be omitted when the processing engine 112 is the server of the second application.

In some embodiments, there may be a plurality of applications (e.g., the applications 380 in FIG. 3) installed on the user terminal 140. In some embodiments, an application may be associated with an online to offline service. For example, a first application installed in the user terminal 140 may be a taxi-hailing application. A second application installed in the user terminal 140 may be a shopping application. If a user of the user terminal 140 wants a virtual item (e.g., an electronic coupon) associated with the second application, the user may transmit, via a network (e.g., the network 120), a request for the virtual item to a server of the second application through the second application. For example, before the first use of the second application, the user may register an account of the second application (also referred to as a target account) and link a phone number with the target account. When the user wants a virtual item (e.g., an electronic coupon) associated with the second application, the user may input the phone number through an interface of the second application (e.g., the I/O 350 in FIG. 3), and transmit the phone number to the server of the second application to request the virtual item. The server of the second application may transmit the virtual item to the target account that is uniquely identifiable with the phone number in the second application.

In order to expand publicity of the second application, the developers of the second application and other applications (e.g., the first application) may be cooperating, so that certain contents related to the second application may be displayed in the other applications. For example, the user may log in the target account through both of the first application and the second application. As another example, an input interface for requesting a virtual item associated with the second application may be displayed in the first application so that the user may request and receive the virtual item associated with the second application through the first application. The user of the user terminal 140 may input the phone number linked with the target account through the entrance in the first application, and transmit, via a network (e.g., the network 120), the phone number to the server of the second application to request the virtual item through the first application. The server of the second application may transmit the virtual item to the first application (e.g., the target account logged in through the first application) based on the phone number. However, in the first application, the phone number may correspond to two or more accounts. For example, the user may also use the phone number to register an account in the first application that is different from the target account. In this case, it is difficult for the server of the second application to identify the target account logged in through the first application based on the phone number. Therefore, the present disclosure provides systems and/or methods (e.g., the process 500 in FIG. 5 and/or the process 600 in FIG. 6) for data processing to solve the problems mentioned above.

Figure 5:
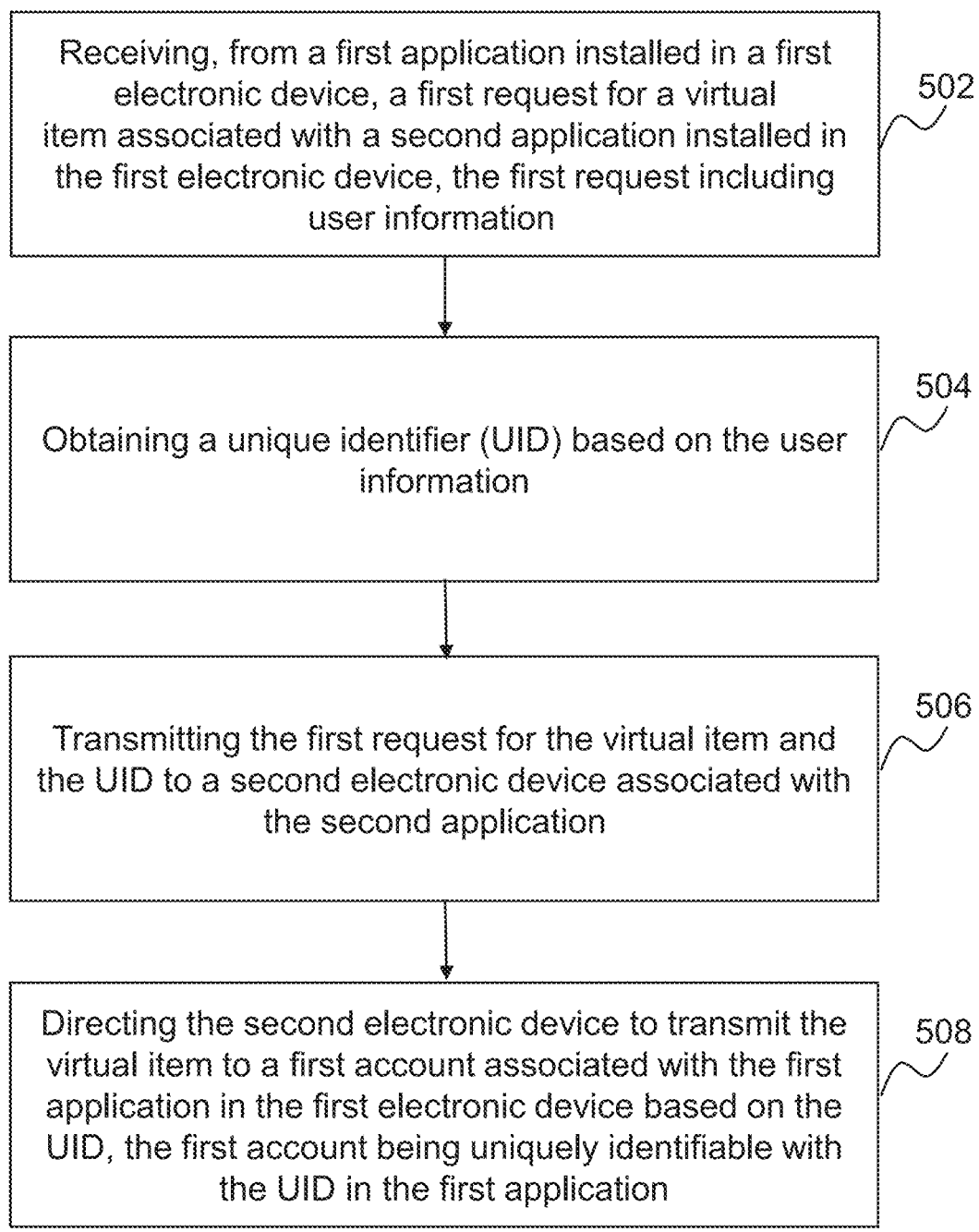
FIG. 5 is a flowchart illustrating an exemplary process for data processing related to an online to offline service according to some embodiments of the present disclosure.

FIG. 5 is a flowchart illustrating an exemplary process for data processing related to an online to offline service according to some embodiments of the present disclosure. In some embodiments, the process 500 may be implemented in the online to offline service system 100 illustrated in FIG. 1. For example, the process 500 may be stored in a storage medium (e.g., the storage device 150, and/or the storage 220 of the processing engine 112) as a form of instructions, and invoked and/or executed by the server 110 (e.g., the processing engine 112 of the server 110, the processor 220 of the processing engine 112, or one or more modules in the processing engine 112 illustrated in FIG. 4A and/or FIG. 4B). The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 502, the receiving module 402 (or the processing engine 112, and/or the interface circuits 210-a) may receive, from a first application installed in a first electronic device (e.g., the user terminal 140), a first request for a virtual item associated with a second application installed in the first electronic device. In some embodiments, the first request may include user information.

In some embodiments, the virtual item may be any non-physical object for use in online to offline services. For example, the virtual item may include an electronic coupon, a digital book, digital music, a digital movie, a digital picture, or the like, or any combination thereof.

In some embodiments, before the first use of the second application, the user of the user terminal 140 may register an account of the second application (also referred to as a target account). The user information may include a user name of the target account, a phone number linked with the target account, an e-mail linked with the target account, a unique identifier (UID) of the target account, or the like, or any combination thereof. In some embodiments, when the user registers an account of an application, the account may be allocated a UID that is unique among all identifiers used for a given set of accounts of different applications. The UID may be in a form of numbers, letters, symbols, characters, codes (e.g., a quick response (QR) code), or the like, or any combination thereof.

In some embodiments, the user may input the user information through the first application (e.g., the I/O 350 in FIG. 3). In some embodiments, the user may log in the target account in the first application and take some actions (e.g. press a button displayed in an interface of the first application) to request the virtual item. After the user presses the button, the first application may automatically identify the user information related to the target account.

In 504, the identification module 404 (or the processing engine 112, and/or the processing circuits 210-b) may obtain a unique identifier (UID) based on the user information.

In some embodiments, if the user information includes the UID, the identification module 404 may directly obtain the UID from the user information. In some embodiments, if the user information includes at least one of the user name of the target account, the phone number linked with the target account, and the e-mail linked with the target account, but does not include the UID, the identification module 404 may process the user name of the target account, the phone number linked with the target account, or the e-mail linked with the target account to obtain the UID. For example, the UID corresponding to the target account may be stored in a storage medium (e.g., the storage device 150, the storage 220 of the processing engine 112, the storage 390 of the user terminal 140, the memory 360 of the user terminal 140, or the storage module 412 of the processing engine 112) of the online to offline service system 100. The identification module 404 may obtain the UID by accessing the storage medium to read the UID based on the user name of the target account, the phone number linked with the target account, or the e-mail linked with the target account.

In 506, the first transmission module 406 (or the processing engine 112, and/or the interface circuits 210-a) may transmit, via a network (e.g., the network 120), the first request for the virtual item and the UID to a second electronic device associated with the second application. In some embodiments, the second electronic device may be a server of the second application.

In 508, the first controlling module 408 (or the processing engine 112, and/or the processing circuits 210-b) may direct the second electronic device to transmit the virtual item to a first account associated with the first application in the first electronic device based on the UID. The first account may be uniquely identifiable with the UID in the first application.

In some embodiments, the user of the user terminal 140 may log in the target account through both of the first application and the second application, and receive and/or request virtual items of the second application through both of the first application and the second application. The first account refers to the target account logged in through the first application. With the UID, the second electronic device may accurately identify the first account in the first application even though there are a plurality of accounts related to the user information in the first application.

In some embodiments, the server 110 may be a server of the first application, a server of the second application, or a third-party server different from the servers of the first application and the second application. When the process 500 is performed by the server 110 that is the server of the second application, operation 506 may be omitted.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 6:
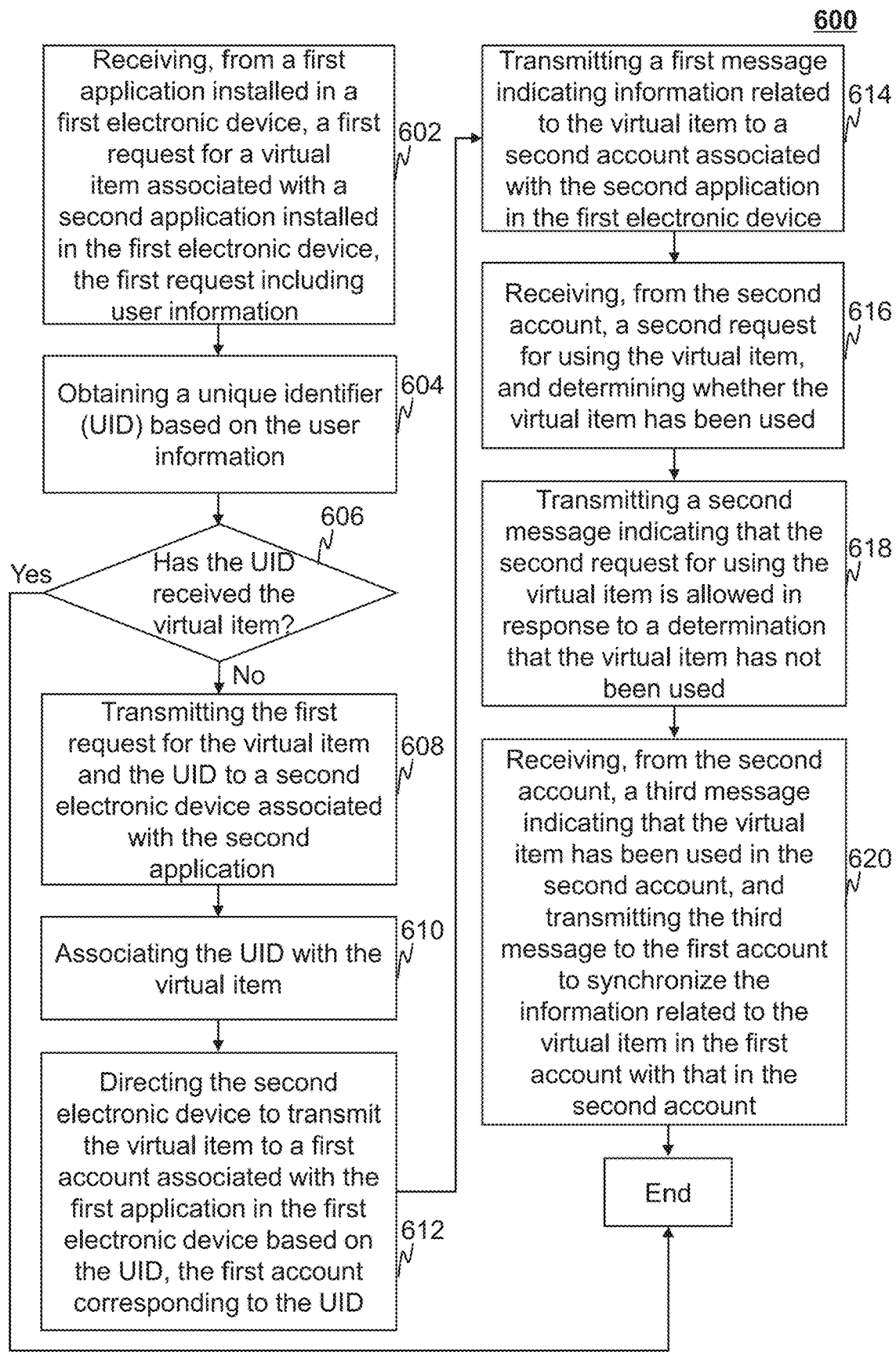
FIG. 6 is a flowchart illustrating an exemplary process for data processing related to an online to offline service according to some embodiments of the present disclosure.

FIG. 6 is a flowchart illustrating an exemplary process for data processing related to an online to offline service according to some embodiments of the present disclosure. In some embodiments, the process 600 may be implemented in the online to offline service system 100 illustrated in FIG. 1. For example, the process 600 may be stored in a storage medium (e.g., the storage device 150, and/or the storage 220 of the processing engine 112) as a form of instructions, and invoked and/or executed by the server 110 (e.g., the processing engine 112 of the server 110, the processor 220 of the processing engine 112, or one or more modules in the processing engine 112 illustrated in FIG. 4A and/or FIG. 4B). The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In 602, the receiving module 402 (or the processing engine 112, and/or the interface circuits 210-a) may receive, from a first application installed in a first electronic device (e.g., the user terminal 140), a first request for a virtual item associated with a second application installed in the first electronic device. The first request may include user information. More details regarding operation 602 may be found elsewhere in the present disclosure (e.g., the description in connection with operation 502 of the process 500 in FIG. 5).

In 604, the identification module 404 (or the processing engine 112, and/or the processing circuits 210-b) may obtain a unique identifier (UID) based on the user information. More details regarding operation 604 may be found elsewhere in the present disclosure (e.g., the description in connection with operation 504 of the process 500 in FIG. 5).

In 606, the judgement module 410 (or the processing engine 112, and/or the processing circuits 210-b) may determine whether the account associated with the UID has previously received the virtual item. In some embodiments, the target account logged in through the first application may be referred to as a first account. The target account logged in through the second application may be referred to as a second account. If the first account or the second account receives the virtual item associated with the second application, a record indicating that the first account or the second account corresponding to the UID has received the virtual item associated with the second application may be generated. The record may be stored in a storage medium (e.g., the storage device 150, the storage 220 of the processing engine 112, the storage 390 of the user terminal 140, the memory 360 of the user terminal 140, or the storage module 412 of the processing engine 112) of the online to offline service system 100. The judgement module 410 may access the storage medium to determine whether there is a record indicating that the first account or the second account corresponding to the UID has received the virtual item associated with the second application.

In response to a determination that the account associated with the UID has received the virtual item, the process 600 may be terminated. In response to a determination that the UID has not received the virtual item, the process 600 may proceed to operation 608, in which the first transmission module 406 (or the processing engine 112, and/or the interface circuits 210-a) may transmit the first request for the virtual item and the UID to a second electronic device associated with the second application. In some embodiments, the second electronic device may be a server of the second application. More details regarding operation 608 may be found elsewhere in the present disclosure (e.g., the description in connection with operation 506 of the process 500 in FIG. 5).

In 610, the storage module 412 (or the processing engine 112, and/or the processing circuits 210-*b*) may associate the UID with the virtual item. For example, the storage module 412 may generate a record indicating that the account corresponding to the UID has received the virtual item and store the record in a storage medium (e.g., the storage device 150, the storage 220 of the processing engine 112, the storage 390 of the user terminal 140, the memory 360 of the user terminal 140, or the storage module 412 of the processing engine 112) of the online to offline service system 100.

In 612, the first controlling module 406 (or the processing engine 112, and/or the processing circuits 210-*b*) may direct the second electronic device to transmit the virtual item to a first account associated with the first application in the first electronic device based on the UID. The first account may be uniquely identifiable with the UID in the first application. More details regarding operation 612 may be found elsewhere in the present disclosure (e.g., the description in connection with operation 508 of the process 500 in FIG. 5).

In 614, the display module 416 (or the processing engine 112, and/or the processing circuits 210-*b*) may transmit a first message indicating information related to the virtual item to a second account associated with the second application in the first electronic device. The second account may refer to the target account logged in through the second application. The information related to the virtual item may include the virtual item itself, information regarding which of the first account or the second account receives the virtual item, a time point of receiving the virtual item, whether the virtual item has been used, which of the first account or the second account uses the virtual item, a time point of using the virtual item, a due date, whether the virtual is valid, usage requirement, or the like, or any combination thereof. For example, for an electronic coupon, the usage requirement may include which online to offline service is configured to use the electronic coupon, other requirement (e.g. how much a user needs to spend) for using the electronic coupon, or the like, or any combination thereof.

In some embodiments, the display module 416 may direct the second electronic device to transmit the virtual item to the second account associated with the second application in the first electronic device. In some embodiments, the display module 416 may simultaneously direct the second electronic device to transmit the virtual item to the first account and the second account. In some embodiments, the display module 416 may direct the second electronic device to transmit the virtual item to the second account after the first account receives the virtual item.

According to operation 614, in some embodiments, even though the user requests and receives the virtual item through the first application (e.g., the first account), the information related to the virtual item may also be displayed in the second application (e.g., the second account).

Merely by way of example, after receiving the virtual item, the first application may generate the first message indicating that the first account receives the virtual item at 9:00 a.m. The first application may transmit the first message to the processing engine 112 (e.g., the display module 416). The display module 416 may transmit the first message to the second account and direct the second electronic device to transmit the virtual item to the second account.

The user of the user terminal 140 may input the user name (or a phone number, an e-mail address linked with the target account) and a password of the target account in the first application or the second application, and transmit the user name (or the phone number, the e-mail address linked with the target account) and the password to the processing engine 112 (e.g., the login module 414). After receiving the user name (or the phone number, the e-mail address linked with the target account) and the password, the login module 414 (or the processing engine 112, and/or the processing circuits 210-*b*) may direct the first application or the second application to log in the target account (e.g., the first account or the second account). According to operation 614, when the user logs in the second account, the user may also see the virtual item and the first message indicating that the first account receives the virtual item at 9:00 a.m. in the second account.

In some embodiments, if the virtual item is requested and received through the second account, the virtual item and the information related to the virtual item may be synchronized to the first account based on a process similar to operation 614.

In 616, the verification module 418 (or the processing engine 112, and/or the processing circuits 210-*b*) may receive, from the second account, a second request for using the virtual item, and determine whether the virtual item has been used. For example, when the user presses a display of the virtual item in the second application, the second application may transmit the second request for using the virtual item to the processing engine 112 (e.g., the verification module 418). If the first account or the second account uses the virtual item, a record indicating that the first account or the second account has used the virtual item may be generated. The record may be stored in a storage medium (e.g., the storage device 150, the storage 220 of the processing engine 112, the storage 390 of the user terminal 140, the memory 360 of the user terminal 140, or the storage module 412 of the processing engine 112) of the online to offline service system 100. The verification module 418 may access the storage medium to determine whether there is a record indicating that the first account or the second account has used the virtual item. In some embodiments, "use the virtual item" may refer to using a virtual item that is the same type as the virtual item that has been transmitted in operation 612 (e.g. using an electronic coupon that has the same discount level and expires at the same time as the electronic coupon received in operation 612). In some embodiments, "use the virtual item" may refer to using the particular virtual item that has been transmitted in operation 612.

In 618, the second controlling module 420 (or the processing engine 112, and/or the processing circuits 210-*b*) may transmit a second message indicating that the second request for using the virtual item is allowed in response to a determination that the virtual item has not been used. According to the second message, the user may use the virtual item.

In 620, the second transmission module 422 (or the processing engine 112, and/or the processing circuits 210-*b*) may receive, from the second account, a third message indicating that the virtual item has been used in the second account, and transmit the third message to the first account to synchronize the information related to the virtual item in the first account with that in the second account.

In some embodiments, after the virtual item has been used in the second application, the second application may generate the third message indicating that the virtual item has been used in the second application. In order to synchronize the information related to the virtual item in the second account with that in the first account, the second application may transmit the third message to the processing engine 112 (e.g., the second transmission module 422). The second transmission module 422 may transmit the third message to the first application (e.g., the first account).

According to operation 620, even when the user uses the virtual item through the second application (e.g., the second account), the information related to the virtual item may also be updated in the first application (e.g., the first account).

In some embodiments, if the virtual item is used in the first account, the information related to the virtual item may be synchronized to the second account based on a process similar to operation 620.

In some embodiments, the processing engine 112 may synchronize the information related to the virtual item in the first account and the second account based on operations 614 and 620.

In some embodiments, the server 110 may be a server of the first application, a server of the second application, or a third-party server different from the servers of the first application and the second application. When the process 600 is performed by the server 110 that is the server of the second application, operation 608 may be omitted.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 610 may be performed after operation 606, and there is no limit on the execution order between operation 610 and any one of operations 608 and 612-620.

Figure 7:
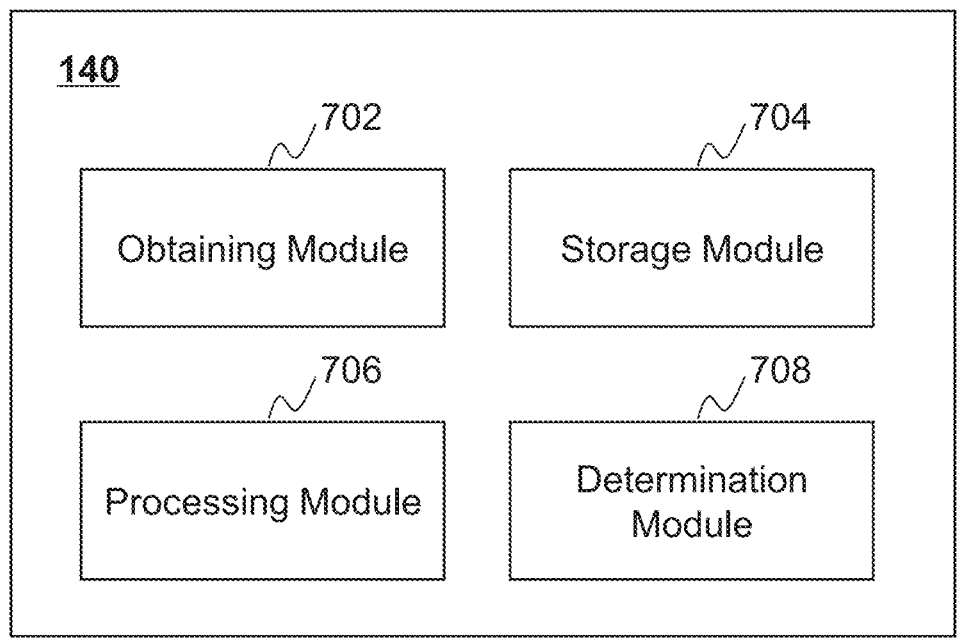
FIG. 7 is a block diagram illustrating an exemplary user terminal according to some embodiments of the present disclosure.

FIG. 7 is a schematic block diagram illustrating an exemplary user terminal according to some embodiments of the present disclosure. The user terminal 140 may include an obtaining module 702, a storage module 704, a processing module 706, and a determination module 708.

The obtaining module 702 may be configured to obtain link information associated with the first set of contents when receiving, from a first application, a first request for accessing a first set of contents associated with a second application. The link information may include a request time stamp and a content pointer. The content pointer may include an application identifier (e.g., uniform resource identifier (URI) scheme) and a content identifier of the first set of contents. In some embodiments, the application identifier, the request time stamp, and the content identifier may be included in a same URI. Merely by way of example, the link information may be "scheme://host/path?query©_time=1497860457300." "scheme://" refers to the URI scheme of the second application. "host/path?query" refers to the content identifier of the first set of contents. "time=1497860457300" refers to the request time stamp. In some embodiments, the application identifier, the request time stamp, and the content identifier may be not included in a same URI.

In some embodiments, the first set of contents associated with the second application may be shared in the first application in a form of a link. When a user of the user terminal 140 requests, through the first application, for accessing the first set of contents (e.g., the user clicks the shared link of the first set of contents in the first application), the obtaining module 702 may obtain the link information of the first set of contents based on the shared link. The obtaining module 702 may record the time when the user requests for accessing the first set of contents as the request time stamp and store the request time stamp in a storage medium (e.g., the storage device 150, the storage 390, the memory 360, or the storage module 704).

The storage module 704 may be configured to place the link information to a predetermined storage space (e.g., a clipboard, the storage 390, the memory 360, or the storage module 704) in the user terminal 140. The predetermined storage space may be independent of the first application installed in the user terminal 140.

In some embodiments, the user terminal 140 may delete the link information from the predetermined storage space in a period of time (e.g., 2 days) after the request time stamp. In some embodiments, when the user clicks the link of the first set of contents in the first application for the first time, the storage module 704 may place first link information of the first set of contents to the predetermined storage space. After a period of time, when the user clicks the link of the first set of contents in the first application for the second time, the storage module 704 may place second link information of the first set of contents to the predetermined storage space by replacing the first link information.

The processing module 706 may be configured to invoke the second application based on the content pointer and obtain an invoking time stamp to determine a time interval between the request time stamp and the invoking time stamp. When the second application is invoked, the processing module 706 may record the time when the second application is invoked as the invoking time stamp and store the invoking time stamp in a storage medium (e.g., the storage device 150, the storage 390, the memory 360, or the storage module 704).

Merely by way of example, the processing module 706 may display, in the first application, a message for inquiring the user whether to invoke the second application. When receiving a positive feedback (e.g., a user instruction of invoking the second application) from the user, the processing module 706 may invoke the second application through the first application based on the content pointer. When receiving a negative feedback (e.g., a user instruction of not invoking the second application) from the user, the processing module 706 may access the first set of contents in the first application or a browser in the user terminal 140. Alternatively, the processing module 706 may directly invoke the second application through the first application based on the content pointer, without the operation of inquiring the user whether to invoke the second application.

In some embodiments, the processing module 706 may be further configured to determine whether the second application has been installed in the user terminal 140. Merely by way of example, the processing module 706 may access a storage medium (e.g., the memory 360, the storage 390, or the storage module 704) to read an installation list of the user terminal 140 to determine whether the second application has been installed in the user terminal 140. In response to a determination that the second application has been installed in the user terminal 140, the processing module 706 may invoke the second application based on the content pointer and obtain the invoking time stamp to determine the time interval between the request time stamp and the invoking time stamp. In response to a determination that the second application has not been installed in the user terminal 140, the processing module 706 may automatically download, install, and invoke the second application based on the content pointer. Alternatively, the processing module 706 may inquire the user before at least one of the operation for downloading the second application, the operation for installing the second application, and the operation for invoking the second application.

The determination module 708 may be configured to determine whether to access the first set of contents in the second application based on the time interval. In some embodiments, the determination module 708 may compare the time interval with a predetermined time threshold. In response to a comparison result that the time interval is less than the predetermined time threshold, the determination module 708 may access the first set of contents in the second application based on the content pointer in the predetermined storage space. In response to a comparison result that the time interval is equal to or greater than the predetermined time threshold, the determination module 708 may access a second set of contents (e.g., a homepage or predetermined default contents) in the second application based on default settings (e.g., the URI scheme) of the second application.

In some embodiments, if the second application is invoked in a relatively long time (e.g., more than 1 hour, 2 hours, 5 hours, 1 day, or 1 week) after the user requests to access the first set of instructions, it may indicate that the user has lost interested in the first set of contents. In this case, the determination module 708 may access the homepage of the second application other than the first set of contents.

In some embodiments, the predetermined time threshold may be a fixed time period, or may be adjustable depending on different situations. For example, the user terminal 140 may detect a running state (e.g., a state of running in the background of the user terminal 140, a closed state, and an uninstalled state) of the second application in the user terminal 140 and determine the predetermined time threshold based on the running state of the second application in the user terminal 140. If the second application is running in the background of the user terminal 140, the predetermined time threshold may be the shortest (e.g., 1 second, 2 seconds, or 3 seconds) among the three running states because it may take the user terminal 140 shorter time to invoke the second application to run in the foreground of the user terminal 140. If the second application is closed, the predetermined time threshold may be longer (e.g., 5 seconds) than the state of running in the background of the user terminal 140 because it may take the user terminal 140 a longer time to invoke the second application to run in the foreground of the user terminal 140. If the second application is uninstalled in the user terminal 140, the predetermined time threshold may be longest (e.g., 1 minute, 2, minutes, 5 minutes, or 10 minutes) among the three running states because it may take the user terminal 140 longest time to invoke the second application to run in the foreground of the user terminal 140.

Merely by way of example, if the second application has not been installed in the user terminal 140, the processing module 706 may automatically download, install, and invoke the second application immediately or substantially immediately (e.g. less than 3, 5 or 10 seconds) after the user clicks the shared link of the first set of contents. In this case, the time interval between the request time stamp and the invoking time stamp may be reasonably short for an ordinary person in the art and shorter than the predetermined time threshold. The determination module 708 may access the first set of contents in the second application based on the content pointer in the predetermined storage space.

As another example, if the second application has not been installed in the user terminal 140, the processing module 706 may automatically download and install the second application immediately or substantially immediately after the user clicks the shared link of the first set of contents. Immediately or substantially immediately after the second application is installed, the processing module 706 may inquire the user whether to invoke the second application. If the user transmits a positive feedback (e.g., a user instruction of invoking the second application) immediately or substantially immediately after receiving the inquiry, the processing module 706 may invoke the second application immediately or substantially immediately after receiving the positive feedback from the user. In this case, the time interval between the request time stamp and the invoking time stamp may be reasonably short for an ordinary person in the art and shorter than the predetermined time threshold. The determination module 708 may access the first set of contents in the second application based on the content pointer in the predetermined storage space. If the user transmits a positive feedback (e.g., a user instruction of invoking the second application) in a relatively long time (e.g., more than 30 minutes, 1 hours, 2 hours, 1 day) after receiving the inquiry, the time interval between the request time stamp and the invoking time stamp may be relatively long for an ordinary person in the art and longer than the predetermined time threshold. The determination module 708 may access the homepage of the second application.

As still another example, if the second application has been installed in the user terminal 140, the processing module 706 may automatically invoke the second application immediately or substantially immediately after the user clicks the shared link of the first set of contents. In this case, the time interval between the request time stamp and the invoking time stamp may be reasonably short for an ordinary person in the art and shorter than the predetermined time threshold. The determination module 708 may access the first set of contents in the second application based on the content pointer in the predetermined storage space.

As still another example, if the second application has been installed in the user terminal 140, the processing module 706 may inquire the user whether to invoke the second application immediately or substantially immediately after the user clicks the shared link of the first set of contents. If the user transmits a positive feedback (e.g., a user instruction of invoking the second application) immediately or substantially immediately after receiving the inquiry, the processing module 706 may invoke the second application immediately or substantially immediately after receiving the positive feedback from the user. In this case, the time interval between the request time stamp and the invoking time stamp may be reasonably short for an ordinary person in the art and shorter than the predetermined time threshold. The determination module 708 may access the first set of contents in the second application based on the content pointer in the predetermined storage space. If the user transmits a positive feedback (e.g., a user instruction of invoking the second application) in a relatively long time (e.g., more than 30 minutes, 1 hours, or 2 hours) after receiving the inquiry, the time interval between the request time stamp and the invoking time stamp may be relatively long for an ordinary person in the art and longer than the predetermined time threshold. The determination module 708 may access the homepage of the second application.

As still another example, after a relatively long time (e.g., 1 day, or 1 week) for accessing, through the first application, the first set of contents in the second application, the user may invoke the second application by clicking the icon of the second application in the user terminal 140. Without the operation 1008 for determining whether to access the first set of contents in the second application based on the time interval, the user terminal 140 may still access the first set of contents in the second application under the action of the content pointer in the predetermined storage space. However, in this case, the purpose of the user to invoke the second application may be to access other contents other than the first set of contents. With the operation 1008, the user terminal 140 may determine that the time interval between the request time stamp and the invoking time stamp is longer than predetermined time threshold and access the homepage of the second application.

In some embodiments, the user terminal 140 may perform the process 1000 under the combined action of a first set of instructions and a set of second instructions stored in a storage medium (e.g., the storage 390, the memory 360, or the storage module 704). Merely by way of example, the first set of instructions may be configured to direct the user terminal 140 to perform operations 1002, 1004, and 1008, and the operation for determine the time interval between the request time stamp and the invoking time stamp. The second set of instructions may be configured to direct the user terminal 140 to perform the operation for invoking the second application through the first application, the operation for accessing the first set of instruction in the second application based on the link information in the predetermined storage space, and the operation for accessing the homepage of the second application. In some embodiments, the first set of instructions and the second set of instructions may be included in same software installed in the user terminal 140. For example, the first set of instructions and the second set of instructions may be included in an application (e.g., the first application, the second application, or other applications such as a software management application) installed in the user terminal 140 or an operation system (e.g., iOS™, Android™, Windows Phone™, etc.) of the user terminal 140. In some embodiments, the first set of instructions and the second set of instructions may be included in different software installed in the user terminal 140. For example, the second set of instructions may be included in an application (e.g., the first application, the second application, or other applications such as a software management application) installed in the user terminal 140, and the first set of instructions may be included in an operation system (e.g., iOS™, Android™, Windows Phone™, etc.) of the user terminal 140 or another application installed in the user terminal 140. As another example, the second set of instructions may be included in an operation system (e.g., iOS™, Android™, Windows Phone™, etc.) of the user terminal 140, and the first set of instructions may be included in an application (e.g., the first application, the second application, or other applications such as a software management application) installed in the user terminal 140.

In some embodiments, if the first set of instructions and/or the second set of instructions are included in an application installed in the user terminal 140, in order to access the first set of contents in the second application, the application may be running in the background of the user terminal 140, running in the foreground of the user terminal 140 (e.g., the first set of instructions and/or the second set of instructions are included in the first application installed in the user terminal 140), or closed when the user terminal 140 receives the first request for accessing the first set of contents associated with the second application.

In some embodiments, even when the first application forbids invoking, through the first application, the second application using the URI scheme of the second application, the user terminal 140 may read the content pointer in the predetermined storage space that is independent of the first application and access the first set of contents in the second application by performing the process 1000. In some embodiments, because the predetermined storage space is an inherent component of the user terminal 140, the process 1000 may be applicable to any operation system.

The modules and/or units in the user terminal 140 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee™, a Near Field Communication (NFC), or the like, or any combination thereof. Two or more of the modules may be combined as a single module, and any one of the modules may be divided into two or more units. For example, the processing module 706 and the determination module 708 may be combined as a single module, which is configured to invoke the second application through the first application and access the first set of contents in the second application. As another example, the obtaining module 702 may be divided into two units. The first unit may be configured to receive, from the first application, the first request for accessing the first set of contents associated with the second application. The second unit may be configured to obtain the content pointer associated with the second application.

It should be noted that the descriptions above in relation to processing engine 112 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure.

Figure 8:
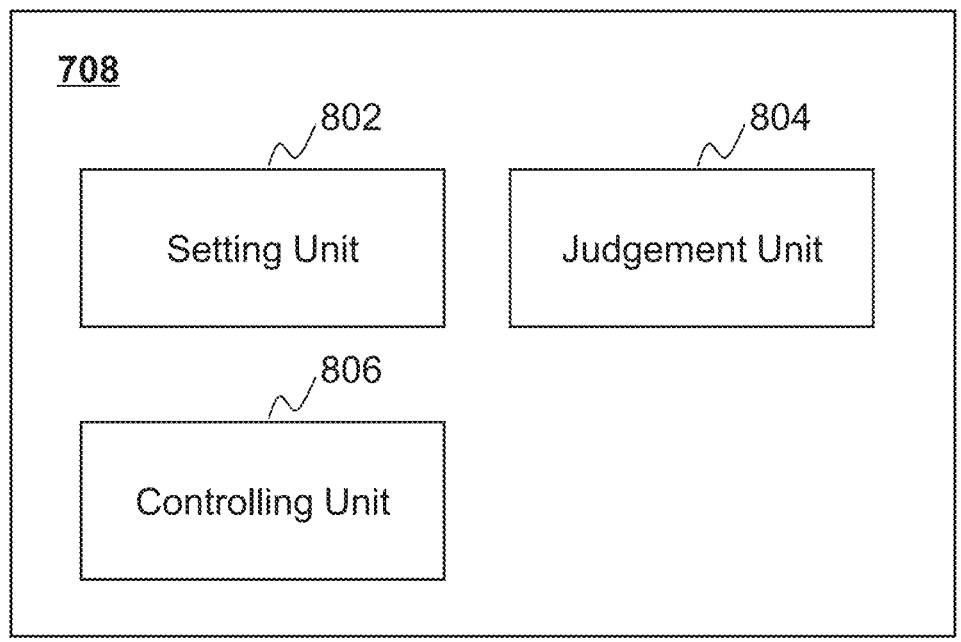
FIG. 8 is a block diagram illustrating an exemplary determination module of a user terminal according to some embodiments of the present disclosure.

FIG. 8 is a schematic block diagram illustrating an exemplary determination module of a user terminal according to some embodiments of the present disclosure. The determination module 708 may include a setting unit 802, a judgement unit 804, and a controlling unit 806.

The setting unit 802 may be configured to obtain a predetermined time threshold based on a running state of the second application.

In some embodiments, the user terminal 140 may detect the running state (e.g., a state of running in the background of the user terminal 140, a closed state, and an uninstalled state) of the second application in the user terminal 140 and determine the predetermined time threshold based on the running state of the second application in the user terminal 140. If the second application is running in the background of the user terminal 140, the predetermined time threshold may be the shortest (e.g., 1 second, 2 seconds, or 3 seconds) among the three running states because it may take the user terminal 140 shorter time to invoke the second application to run in the foreground of the user terminal 140. If the second application is closed, the predetermined time threshold may be longer (e.g., 5 seconds) than the state of running in the background of the user terminal 140 because it may take the user terminal 140 a longer time to invoke the second application to run in the foreground of the user terminal 140. If the second application is uninstalled in the user terminal 140, the predetermined time threshold may be longest (e.g., 1 minute, 2, minutes, 5 minutes, or 10 minutes) among the three running states because it may take the user terminal 140 longest time to invoke the second application to run in the foreground of the user terminal 140.

The judgement unit 804 may be configured to compare the time interval between the request time stamp and the invoking time stamp with the predetermined time threshold. In response to a comparison result that the time interval is less than the predetermined time threshold, the controlling unit may access the first set of contents in the second application based on the content pointer in the predetermined storage space. In response to a comparison result that the time interval is equal to or greater than the predetermined time threshold, the controlling unit may access a second set of contents (e.g., a homepage or predetermined default contents) in the second application based on default settings (e.g., the URI scheme) of the second application.

The controlling unit may be configured to access certain contents (e.g., the first set of contents, and/or the second set of contents) of the second application.

It should be noted that the descriptions above in relation to processing engine 112 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure.

With the arrival of the mobile Internet era, link sharing becomes an important and common way for spreading information. A link associated with a second application may be shared in a first application (e.g., a social application) installed a user terminal (e.g., the user terminal 140). When a user of the user terminal 140 (e.g., a smart phone) clicks the shared link, it is hopes that the second application is invoked through the first application and the link is accessed in the second application, which drives traffic and attracts new users to the second application.

, which is shared in a first application installed in the user terminal 140, associated with a second application through the first application, the user hopes that the second application may be invoked and to view the content of the shared link in the second application rather than the first application or a browser in the user terminal 140.

In existing technologies for invoking an application in a mobile device, Universal Links are applicable to iphone operation system (IOS™) but not to Android™ operation system. APP Links are applicable to part of Android™ operation system (e.g., Android™ M). In the Android™ operation system, if the first application (e.g., a social networking application such as WeChat™) sharing the link associated with the second application forbids invoking the second application through the first application using a uniform resource identifier (URI) scheme of the second application, the user may view the content of the link in the first application or a browser in the user terminal 140. If a third application (e.g., a software management application) installed in the user terminal 140 can be used to invoke the second application through the first application, only the home page of the second application other than the specific contents of the link is accessed. Therefore, the present disclosure provides methods and/or systems to invoke the second application through the first application and access the content of the link in the second application.

FIG. 9 is a flowchart illustrating an exemplary process for data processing related to an online to offline service according to some embodiments of the present disclosure. In some embodiments, the process 900 may be implemented in the online to offline service system 100 illustrated in FIG. 1. For example, the process 900 may be stored in a storage medium (e.g., the storage device 150, the storage 390 of the user terminal 140, the memory 360 of the user terminal 140, or the storage module 704 of the user terminal 140) as a form of instructions, and invoked and/or executed by the user terminal 140 (e.g., the CPU 340 of the user terminal 140, or one or more modules and/or units in the user terminal 140 illustrated in FIG. 7 and/or FIG. 8). The operations of the illustrated process 900 presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting.

In 902, when receiving, from a first application, a first request for accessing a first set of contents associated with a second application, the obtaining module 702 (or the user terminal 140) may obtain a content pointer associated with the first set of contents. The content pointer may include an application identifier (e.g., uniform resource identifier (URI) scheme) and a content identifier of the first set of contents. In some embodiments, the application identifier and the content identifier may be included in a same URI. For example, the content pointer may be "scheme://host/path?query." "scheme://" refers to the URI scheme of the second application. "host/path?query" refers to the content identifier of the first set of contents. In some embodiments, the application identifier and the content identifier may be not included in a same URI. In some embodiments, when the contents are associated with a webpage, the content pointer may also be referred to as link information.

In some embodiments, there may be a plurality of applications (e.g., the applications 380 in FIG. 3) installed on the user terminal 140. An application may be associated with an online to offline service. For example, the first application installed in the user terminal 140 may be a social networking application such as WeChat™ or QQ™. The second application may be a content provider such as Douban™ or Zhihu™. It should be noted that the above examples for the first application and the second application are merely provided for the purposes of illustration, and not intended to limit the scope of the present disclosure. The first application or the second application may be any application.

In some embodiments, the first set of contents associated with the second application may be shared in the first application in a form of a link. When a user of the user terminal 140 requests, through the first application, for accessing the first set of contents (e.g., the user clicks the shared link of the first set of contents in the first application), the obtaining module 702 may obtain the content pointer of the first set of contents based on the shared link. In some embodiments, a "set of contents" may refer to contents in a webpage.

In 904, the storage module 704 (or the user terminal 140) may place the content pointer to a predetermined storage space (e.g., a clipboard, the storage 390, the memory 360, or the storage module 704) in the user terminal 140. The predetermined storage space may be independent of the first application as part of the user terminal 140.

In 906, the processing module 706 (or the user terminal 140) may invoke the second application based on the content pointer.

Merely by way of example, the processing module 706 may display, in the first application, a message for inquiring the user whether to invoke the second application. When receiving a positive feedback (e.g., a user instruction of invoking the second application) from the user, the processing module 706 may invoke the second application through the first application based on the content pointer (e.g., the application identifier). When receiving a negative feedback (e.g., a user instruction of not invoking the second application) from the user, the processing module 706 may access the first set of contents in the first application or a browser in the user terminal 140. Alternatively, the processing module 706 may directly invoke the second application through the first application based on the content pointer, without inquiring the user whether to invoke the second application.

In some embodiments, before 906, the processing module 706 (or the user terminal 140) may determine whether the second application has been installed in the user terminal 140. Merely by way of example, the processing module 706 may access a storage medium (e.g., the memory 360, the storage 390, or the storage module 704) to read an installation list of the user terminal 140 to determine whether the second application has been installed in the user terminal 140. In response to a determination that the second application has been installed in the user terminal 140, the processing module 706 may perform operation 906. In response to a determination that the second application has not been installed in the user terminal 140, the processing module 706 may automatically download, install, and invoke the second application based on the content pointer. Alternatively, the processing module 706 may inquire the user before at least one of the operation for downloading the second application, the operation for installing the second application, and the operation for invoking the second application.

In 908, the determination module 708 (or the user terminal 140) may access the first set of contents in the second application based on the content pointer in the predetermined storage space.

In some embodiments, the user terminal 140 may perform the process 900 under the combined action of a first set of instructions and a set of second instructions stored in a storage medium (e.g., the storage 390, the memory 360, or the storage module 704). Merely by way of example, the first set of instructions may be configured to direct the user terminal 140 to perform operations 902 and 904. The second set of instructions may be configured to direct the user terminal 140 to perform operations 906 and 908. In some embodiments, the first set of instructions and the second set of instructions may be included in same software installed in the user terminal 140. For example, the first set of instructions and the second set of instructions may be included in an application (e.g., the first application, the second application, or other applications such as a software management application) installed in the user terminal 140 or an operation system (e.g., iOS™, Android™, Windows Phone™, etc.) of the user terminal 140. In some embodiments, the first set of instructions and the second set of instructions may be included in different applications installed in the user terminal 140. For example, the second set of instructions may be included in an application (e.g., the first application, the second application, or other applications such as a software management application) installed in the user terminal 140, and the first set of instructions may be included in an operation system (e.g., iOS™, Android™, Windows Phone™, etc.) of the user terminal 140 or another application installed in the user terminal 140. As another example, the second set of instructions may be included in an operation system (e.g., iOS™, Android™, Windows Phone™, etc.) of the user terminal 140, and the first set of instructions may be included in an application (e.g., the first application, the second application, or other applications such as a software management application) installed in the user terminal 140.

In some embodiments, if the first set of instructions and/or the second set of instructions are included in an application installed in the user terminal 140, in order to access the first set of contents in the second application, the application may be running in the background of the user terminal 140, running in the foreground of the user terminal 140 (e.g., the first set of instructions and/or the second set of instructions are included in the first application installed in the user terminal 140), or closed when the user terminal 140 receives the first request for accessing the first set of contents associated with the second application.

In some embodiments, even when the first application forbids invoking, through the first application, the second application using the URI scheme of the second application, the user terminal 140 may read the content pointer in the predetermined storage space that is independent of the first application and access the first set of contents in the second application by performing the process 900. In some embodiments, because the predetermined storage space is an inherent component of the user terminal 140, the process 900 may be applicable to any operation system.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 10 is a flowchart illustrating an exemplary process for data processing related to an online to offline service according to some embodiments of the present disclosure. In some embodiments, the process 1000 may be implemented in the online to offline service system 100 illustrated in FIG. 1. For example, the process 1000 may be stored in a storage medium (e.g., the storage device 150, the storage 390 of the user terminal 140, the memory 360 of the user terminal 140, or the storage module 704 of the user terminal 140) as a form of instructions, and invoked and/or executed by the user terminal 140 (e.g., the CPU 340 of the user terminal 140, or one or more modules and/or units in the user terminal 140 illustrated in FIG. 7 and/or FIG. 8). The operations of the illustrated process 1000 presented below are intended to be illustrative. In some embodiments, the process 1000 may be accomplished with one or more additional operations not described, and/or without one or more of the operations discussed. Additionally, the order in which the operations of the process 1000 as illustrated in FIG. 10 and described below is not intended to be limiting.

In 1002, when receiving, from a first application, a first request for accessing a first set of contents associated with a second application, the obtaining module 702 (or the user terminal 140) may obtain link information associated with the first set of contents. The link information may include a request time stamp and a content pointer. The content pointer may include an application identifier (e.g., uniform resource identifier (URI) scheme) and a content identifier of the first set of contents. In some embodiments, the application identifier, the request time stamp, and the content identifier may be included in a same URI. Merely by way of example, the link information may be "scheme://host/path?query©_time=1497860457300." "scheme://" refers to the URI scheme of the second application. "host/path?query" refers to the content identifier of the first set of contents. "time=1497860457300" refers to the request time stamp. In some embodiments, the application identifier, the request time stamp, and the content identifier may be not included in a same URI.

In some embodiments, the first set of contents associated with the second application may be shared in the first application in a form of a link. When a user of the user terminal 140 requests, through the first application, for accessing the first set of contents (e.g., the user clicks the shared link of the first set of contents in the first application), the obtaining module 702 may obtain the link information of the first set of contents based on the shared link. The obtaining module 702 may record the time when the user requests for accessing the first set of contents as the request time stamp and store the request time stamp in a storage medium (e.g., the storage device 150, the storage 390, the memory 360, or the storage module 704).

In 1004, the storage module 704 (or the user terminal 140) may place the link information to a predetermined storage space (e.g., a clipboard, the storage 390, the memory 360, or the storage module 704) in the user terminal 140. The predetermined storage space may be independent of the first application installed in the user terminal 140.

In some embodiments, the user terminal 140 may delete the link information from the predetermined storage space in a period of time (e.g., 2 days) after the request time stamp. In some embodiments, when the user clicks the link of the first set of contents in the first application for the first time, the storage module 704 may place first link information of the first set of contents to the predetermined storage space. After a period of time, when the user clicks the link of the first set of contents in the first application for the second time, the storage module 704 may place second link information of the first set of contents to the predetermined storage space by replacing the first link information.

In 1006, the processing module 706 (or the user terminal 140) may invoke the second application based on the content pointer and obtain an invoking time stamp to determine a time interval between the request time stamp and the invoking time stamp. When the second application is invoked, the processing module 706 may record the time when the second application is invoked as the invoking time stamp and store the invoking time stamp in a storage medium (e.g., the storage device 150, the storage 390, the memory 360, or the storage module 704).

Merely by way of example, the processing module 706 may display, in the first application, a message for inquiring the user whether to invoke the second application. When receiving a positive feedback (e.g., a user instruction of invoking the second application) from the user, the processing module 706 may invoke the second application through the first application based on the content pointer. When receiving a negative feedback (e.g., a user instruction of not invoking the second application) from the user, the processing module 706 may access the first set of contents in the first application or a browser in the user terminal 140. Alternatively, the processing module 706 may directly invoke the second application through the first application based on the content pointer, without the operation of inquiring the user whether to invoke the second application.

In some embodiments, before 1006, the processing module 706 may determine whether the second application has been installed in the user terminal 140. Merely by way of example, the processing module 706 may access a storage medium (e.g., the memory 360, the storage 390, or the storage module 704) to read an installation list of the user terminal 140 to determine whether the second application has been installed in the user terminal 140. In response to a determination that the second application has been installed in the user terminal 140, the processing module 706 may perform operation 1006. In response to a determination that the second application has not been installed in the user terminal 140, the processing module 706 may automatically download, install, and invoke the second application based on the content pointer. Alternatively, the processing module 706 may inquire the user before at least one of the operation for downloading the second application, the operation for installing the second application, and the operation for invoking the second application.

In 1008, the determination module 708 (or the user terminal 140) may determine whether to access the first set of contents in the second application based on the time interval. In some embodiments, the determination module 708 may compare the time interval with a predetermined time threshold. In response to a comparison result that the time interval is less than the predetermined time threshold, the determination module 708 may access the first set of contents in the second application based on the content pointer in the predetermined storage space. In response to a comparison result that the time interval is equal to or greater than the predetermined time threshold, the determination module 708 may access a second set of contents (e.g., a homepage or predetermined default contents) in the second application based on default settings (e.g., the URI scheme) of the second application.

In some embodiments, if the second application is invoked in a relatively long time (e.g., more than 1 hour, 2 hours, 5 hours, 1 day, or 1 week) after the user requests to access the first set of instructions, it may indicate that the user has lost interested in the first set of contents. In this case, the determination module 708 may access the homepage of the second application other than the first set of contents.

In some embodiments, the predetermined time threshold may be a fixed time period, or may be adjustable depending on different situations. For example, the user terminal 140 may detect a running state (e.g., a state of running in the background of the user terminal 140, a closed state, and an uninstalled state) of the second application in the user terminal 140 and determine the predetermined time threshold based on the running state of the second application in the user terminal 140. If the second application is running in the background of the user terminal 140, the predetermined time threshold may be the shortest (e.g., 1 second, 2 seconds, or 3 seconds) among the three running states because it may take the user terminal 140 shorter time to invoke the second application to run in the foreground of the user terminal 140. If the second application is closed, the predetermined time threshold may be longer (e.g., 5 seconds) than the state of running in the background of the user terminal 140 because it may take the user terminal 140 a longer time to invoke the second application to run in the foreground of the user terminal 140. If the second application is uninstalled in the user terminal 140, the predetermined time threshold may be longest (e.g., 1 minute, 2, minutes, 5 minutes, or 10 minutes) among the three running states because it may take the user terminal 140 longest time to invoke the second application to run in the foreground of the user terminal 140.

Merely by way of example, if the second application has not been installed in the user terminal 140, the processing module 706 may automatically download, install, and invoke the second application immediately or substantially immediately (e.g. less than 3, 5 or 10 seconds) after the user clicks the shared link of the first set of contents. In this case, the time interval between the request time stamp and the invoking time stamp may be reasonably short for an ordinary person in the art and shorter than the predetermined time threshold. The determination module 708 may access the first set of contents in the second application based on the content pointer in the predetermined storage space.

As another example, if the second application has not been installed in the user terminal 140, the processing module 706 may automatically download and install the second application immediately or substantially immediately after the user clicks the shared link of the first set of contents. Immediately or substantially immediately after the second application is installed, the processing module 706 may inquire the user whether to invoke the second application. If the user transmits a positive feedback (e.g., a user instruction of invoking the second application) immediately or substantially immediately after receiving the inquiry, the processing module 706 may invoke the second application immediately or substantially immediately after receiving the positive feedback from the user. In this case, the time interval between the request time stamp and the invoking time stamp may be reasonably short for an ordinary person in the art and shorter than the predetermined time threshold. The determination module 708 may access the first set of contents in the second application based on the content pointer in the predetermined storage space. If the user transmits a positive feedback (e.g., a user instruction of invoking the second application) in a relatively long time (e.g., more than 30 minutes, 1 hours, 2 hours, 1 day) after receiving the inquiry, the time interval between the request time stamp and the invoking time stamp may be relatively long for an ordinary person in the art and longer than the predetermined time threshold. The determination module 708 may access the homepage of the second application.

As still another example, if the second application has been installed in the user terminal 140, the processing module 706 may automatically invoke the second application immediately or substantially immediately after the user clicks the shared link of the first set of contents. In this case, the time interval between the request time stamp and the invoking time stamp may be reasonably short for an ordinary person in the art and shorter than the predetermined time threshold. The determination module 708 may access the first set of contents in the second application based on the content pointer in the predetermined storage space.

As still another example, if the second application has been installed in the user terminal 140, the processing module 706 may inquire the user whether to invoke the second application immediately or substantially immediately after the user clicks the shared link of the first set of contents. If the user transmits a positive feedback (e.g., a user instruction of invoking the second application) immediately or substantially immediately after receiving the inquiry, the processing module 706 may invoke the second application immediately or substantially immediately after receiving the positive feedback from the user. In this case, the time interval between the request time stamp and the invoking time stamp may be reasonably short for an ordinary person in the art and shorter than the predetermined time threshold. The determination module 708 may access the first set of contents in the second application based on the content pointer in the predetermined storage space. If the user transmits a positive feedback (e.g., a user instruction of invoking the second application) in a relatively long time (e.g., more than 30 minutes, 1 hours, or 2 hours) after receiving the inquiry, the time interval between the request time stamp and the invoking time stamp may be relatively long for an ordinary person in the art and longer than the predetermined time threshold. The determination module 708 may access the homepage of the second application.

As still another example, after a relatively long time (e.g., 1 day, or 1 week) for accessing, through the first application, the first set of contents in the second application, the user may invoke the second application by clicking the icon of the second application in the user terminal 140. Without the operation 1008 for determining whether to access the first set of contents in the second application based on the time interval, the user terminal 140 may still access the first set of contents in the second application under the action of the content pointer in the predetermined storage space. However, in this case, the purpose of the user to invoke the second application may be to access other contents other than the first set of contents. With the operation 1008, the user terminal 140 may determine that the time interval between the request time stamp and the invoking time stamp is longer than predetermined time threshold and access the homepage of the second application.

In some embodiments, the user terminal 140 may perform the process 1000 under the combined action of a first set of instructions and a set of second instructions stored in a storage medium (e.g., the storage 390, the memory 360, or the storage module 704). Merely by way of example, the first set of instructions may be configured to direct the user terminal 140 to perform operations 1002, 1004, and 1008, and the operation for determine the time interval between the request time stamp and the invoking time stamp. The second set of instructions may be configured to direct the user terminal 140 to perform the operation for invoking the second application through the first application, the operation for accessing the first set of instruction in the second application based on the link information in the predetermined storage space, and the operation for accessing the homepage of the second application. In some embodiments, the first set of instructions and the second set of instructions may be included in same software installed in the user terminal 140. For example, the first set of instructions and the second set of instructions may be included in an application (e.g., the first application, the second application, or other applications such as a software management application) installed in the user terminal 140 or an operation system (e.g., iOS™, Android™, Windows Phone™, etc.) of the user terminal 140. In some embodiments, the first set of instructions and the second set of instructions may be included in different software installed in the user terminal 140. For example, the second set of instructions may be included in an application (e.g., the first application, the second application, or other applications such as a software management application) installed in the user terminal 140, and the first set of instructions may be included in an operation system (e.g., iOS™, Android™, Windows Phone™, etc.) of the user terminal 140 or another application installed in the user terminal 140. As another example, the second set of instructions may be included in an operation system (e.g., iOS™, Android™, Windows Phone™, etc.) of the user terminal 140, and the first set of instructions may be included in an application (e.g., the first application, the second application, or other applications such as a software management application) installed in the user terminal 140.

In some embodiments, if the first set of instructions and/or the second set of instructions are included in an application installed in the user terminal 140, in order to access the first set of contents in the second application, the application may be running in the background of the user terminal 140, running in the foreground of the user terminal 140 (e.g., the first set of instructions and/or the second set of instructions are included in the first application installed in the user terminal 140), or closed when the user terminal 140 receives the first request for accessing the first set of contents associated with the second application.

In some embodiments, even when the first application forbids invoking, through the first application, the second application using the URI scheme of the second application, the user terminal 140 may read the content pointer in the predetermined storage space that is independent of the first application and access the first set of contents in the second application by performing the process 1000. In some embodiments, because the predetermined storage space is an inherent component of the user terminal 140, the process 1000 may be applicable to any operation system.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 11:
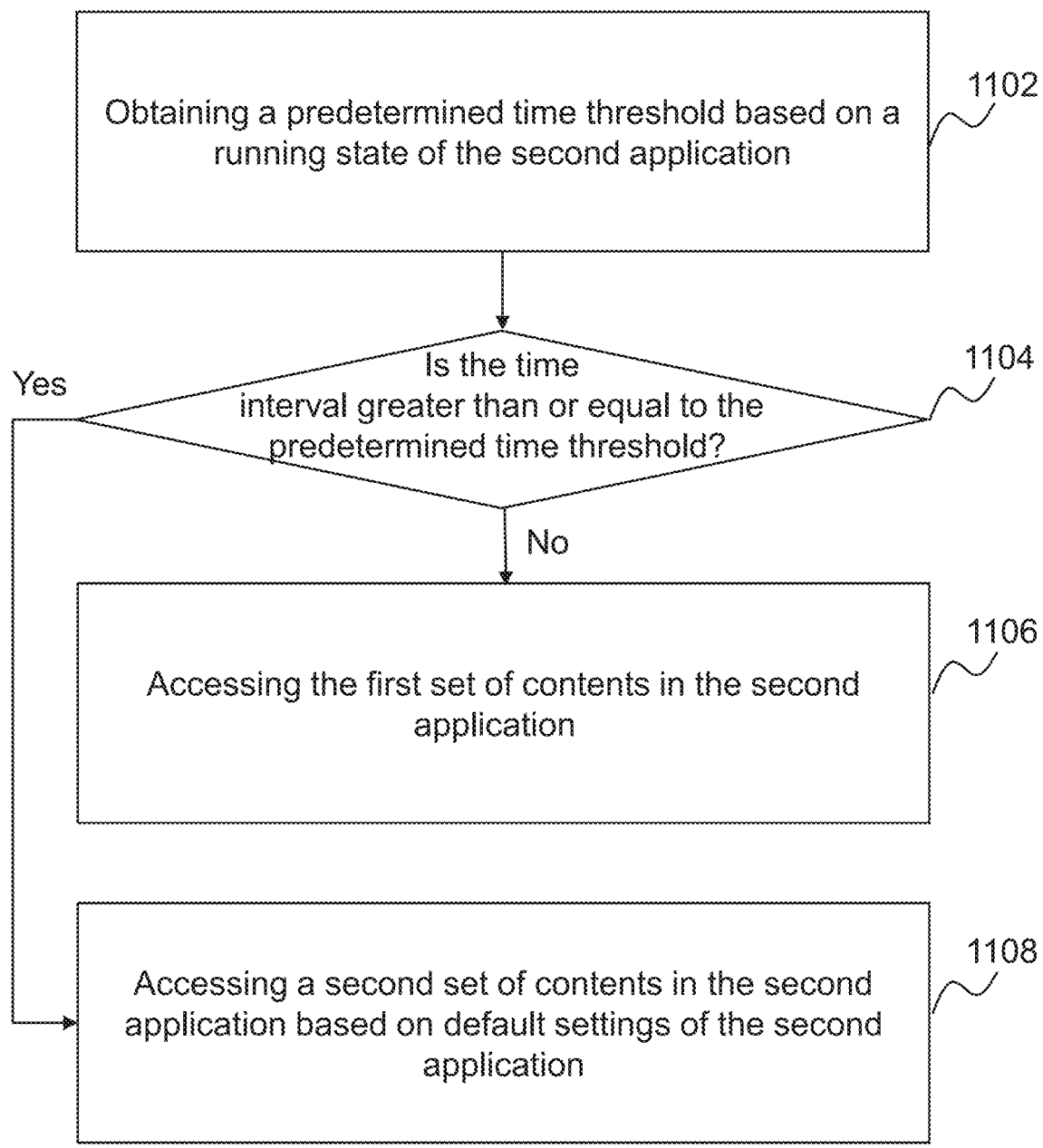
FIG. 11 is a flowchart illustrating an exemplary process for determining whether to access a first set of contents in a second application according to some embodiments of the present disclosure.

FIG. 11 is a flowchart illustrating an exemplary process for determining whether to access a first set of contents in a second application according to some embodiments of the present disclosure. In some embodiments, the process 1100 may be implemented in the online to offline service system 100 illustrated in FIG. 1. For example, the process 1100 may be stored in a storage medium (e.g., the storage device 150, the storage 390 of the user terminal 140, the memory 360 of the user terminal 140, or the storage module 704 of the user terminal 140) as a form of instructions, and invoked and/or executed by the user terminal 140 (e.g., the CPU 340 of the user terminal 140, or one or more modules and/or units in the user terminal 140 illustrated in FIG. 7 and/or FIG. 8). The operations of the illustrated process 1100 presented below are intended to be illustrative. In some embodiments, the process 1100 may be accomplished with one or more additional operations not described, and/or without one or more of the operations discussed. Additionally, the order in which the operations of the process 1100 as illustrated in FIG. 11 and described below is not intended to be limiting. In some embodiments, operation 1008 in FIG. 10 may be performed based on the process 1100.

In 1102, the setting unit 802 (or the user terminal 140, and/or the determination module 708) may obtain a predetermined time threshold based on a running state of the second application.

In some embodiments, the user terminal 140 may detect the running state (e.g., a state of running in the background of the user terminal 140, a closed state, and an uninstalled state) of the second application in the user terminal 140 and determine the predetermined time threshold based on the running state of the second application in the user terminal 140. If the second application is running in the background of the user terminal 140, the predetermined time threshold may be the shortest (e.g., 1 second, 2 seconds, or 3 seconds) among the three running states because it may take the user terminal 140 shorter time to invoke the second application to run in the foreground of the user terminal 140. If the second application is closed, the predetermined time threshold may be longer (e.g., 5 seconds) than the state of running in the background of the user terminal 140 because it may take the user terminal 140 a longer time to invoke the second application to run in the foreground of the user terminal 140. If the second application is uninstalled in the user terminal 140, the predetermined time threshold may be longest (e.g., 1 minute, 2, minutes, 5 minutes, or 10 minutes) among the three running states because it may take the user terminal 140 longest time to invoke the second application to run in the foreground of the user terminal 140.

In 1104, the judgement unit 804 (or the user terminal 140, and/or the determination module 708) may compare the time interval between the request time stamp and the invoking time stamp with the predetermined time threshold. In response to a comparison result that the time interval is less than the predetermined time threshold, the process 1100 may proceed to operation 1106, in which the controlling unit (or the user terminal 140, and/or the determination module 708) may access the first set of contents in the second application based on the content pointer in the predetermined storage space. In response to a comparison result that the time interval is equal to or greater than the predetermined time threshold, the process 1100 may proceed to operation 1108, in which the controlling unit (or the user terminal 140, and/or the determination module 708) may access a second set of contents (e.g., a homepage or predetermined default contents) in the second application based on default settings (e.g., the URI scheme) of the second application.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python, or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. An electronic device for data processing, comprising:
   at least one storage medium including a set of instructions;
   at least one processor in communication with the at least one storage medium, wherein when executing the set of instructions, the at least one processor is directed to cause the system to:
      receive, from a first application installed in the electronic device, a first request for accessing a first set of contents associated with a second application in the electronic device;
      in response to the first request, place link information associated with the first set of contents to a predetermined storage space in the electronic device, the predetermined storage space being independent of the first application, wherein the link information includes a request time stamp of the first request and a content pointer of the first set of contents;
      invoke the second application by reading the content pointer of the first set of contents stored in the predetermined storage space;
      obtain an invoking time stamp indicating a time when the second application is invoked;
      compare a time interval between the request time stamp and the invoking time stamp to a predetermined time threshold, wherein the predetermined time threshold is adjustable depending on different running states of the second application; and
      access the first set of contents in the second application according to the content pointer in response to a determination that the time interval is less than the predetermined time threshold, or
      access a second set of contents in the second application according to default settings of the second application in response to a determination that the time interval is equal to or more than the predetermined time threshold.

2. The electronic device of claim 1, wherein when executing the set of instructions, the at least one processor is further directed to cause the system to:
   before invoking the second application, determine that the second application is installed in the electronic device.

3. The electronic device of claim 1, wherein when executing the set of instructions, the at least one processor is further directed to cause the system to:
   before invoking the second application, determine that the second application is not installed in the electronic device; and
   install the second application in the electronic device after obtaining a positive feedback from a user of the electronic device.

4. The electronic device of claim 1, wherein the content pointer includes an application identifier of the second application and a content identifier for the first set of contents.

5. The electronic device of claim 4, wherein the application identifier and the content identifier are included in a same uniform resource identifier (URI).

6. The electronic device of claim 4, wherein the application identifier and the content identifier are included in different URIs.

7. The electronic device of claim 4, wherein the application identifier is a URI scheme.

8. The electronic device of claim 1, wherein the second set of contents are a homepage of the second application.

9. The electronic device of claim 1, wherein the predetermined storage space includes a clipboard in the electronic device.

10. A method for data processing implemented on an electronic device having at least one storage medium and at least one processor, comprising:
   receiving, from a first application installed in the electronic device, a first request for accessing a first set of contents associated with a second application in the electronic device;
   in response to the first request, placing link information associated with the first set of contents to a predetermined storage space in the electronic device, the predetermined storage space being independent of the first application, wherein the link information includes a request time stamp of the first request and a content pointer of the first set of contents;

invoking the second application by reading the content pointer of the first set of contents stored in the predetermined storage space;

obtaining an invoking time stamp indicating a time when the second application is invoked;

comparing a time interval between the request time stamp and the invoking time stamp to a predetermined time threshold, wherein the predetermined time threshold is adjustable depending on different running states of the second application; and accessing the first set of contents in the second application according to the content pointer in response to a determination that the time interval is less than the predetermined time threshold, or accessing a second set of contents in the second application according to default settings of the second application in response to a determination that the time interval is equal to or more than the predetermined time threshold.

11. The method of claim 10, the method further comprising:

before invoking the second application, determining that the second application is installed in the electronic device.

12. The method of claim 10, the method further comprising:

before invoking the second application, determining that the second application is not installed in the electronic device; and installing the second application in the electronic device after obtaining a positive feedback from a user of the electronic device.

13. The method of claim 10, wherein the content pointer includes an application identifier of the second application and a content identifier for the first set of contents.

14. The method of claim 13, wherein the application identifier and the content identifier are included in a same uniform resource identifier (URI).

15. The method of claim 13, wherein the application identifier and the content identifier are included in different URIs.

16. The method of claim 13, wherein the application identifier is a URI scheme.

17. The method of claim 10, wherein the second set of contents are a homepage of the second application.

18. The method of claim 10, wherein the predetermined storage space includes a clipboard in the electronic device.

19. A non-transitory computer readable medium, comprising at least one set of instructions for data processing, wherein when executed by one or more processors of an electronic device, the at least one set of instructions causes the computing device to perform a method, the method comprising:

receiving, from a first application installed in the electronic device, a first request for accessing a first set of contents associated with a second application in the electronic device;

in response to the first request, placing link information associated with the first set of contents to a predetermined storage space in the electronic device, the predetermined storage space being independent of the first application, wherein the link information includes a request time stamp of the first request and a content pointer of the first set of contents;

invoking the second application by reading the content pointer of the first set of contents stored in the predetermined storage space;

obtaining an invoking time stamp indicating a time when the second application is invoked;

comparing a time interval between the request time stamp and the invoking time stamp to a predetermined time threshold, wherein the predetermined time threshold is adjustable depending on different running states of the second application; and accessing the first set of contents in the second application according to the content pointer in response to a determination that the time interval is less than the predetermined time threshold, or accessing a second set of contents in the second application according to default settings of the second application in response to a determination that the time interval is equal to or more than the predetermined time threshold.

20. The non-transitory computer readable medium of claim 19, wherein the predetermined storage space includes a clipboard in the electronic device.

* * * * *